(12) United States Patent
Pavey et al.

(10) Patent No.: US 9,833,692 B2
(45) Date of Patent: *Dec. 5, 2017

(54) GAMES TABLES AND CORNER ASSEMBLIES FOR SAME

(71) Applicant: Merchant Ambassador (Holdings) Ltd., Kowloon (HK)

(72) Inventors: Mark Pavey, Sai Wan Ho (HK); Leung Cheong Shing, Kowloon (HK); Anthony Fiscella, Kowloon (HK); Mak Siu Fung, Tseung Kwan O (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/587,683

(22) Filed: May 5, 2017

(65) Prior Publication Data

US 2017/0232332 A1  Aug. 17, 2017

Related U.S. Application Data

(62) Division of application No. 15/363,962, filed on Nov. 29, 2016.

(Continued)

(51) Int. Cl.
*A47B 3/06* (2006.01)
*A63F 7/06* (2006.01)
(Continued)

(52) U.S. Cl.
CPC ............... *A63F 7/06* (2013.01); *A63B 63/08* (2013.01); *A63B 67/04* (2013.01); *A63F 7/0017* (2013.01);
(Continued)

(58) Field of Classification Search
CPC .. A47B 3/06; A47B 7/02; A47B 25/00; A47B 25/003; A63F 2003/00164;
(Continued)

(56) References Cited

U.S. PATENT DOCUMENTS

| 161,502 | A | * | 3/1875 | Gilbert | .................. A47B 13/08 |
|---|---|---|---|---|---|
| | | | | | 108/90 |
| 1,349,587 | A | | 8/1920 | Smith et al. | |

(Continued)

FOREIGN PATENT DOCUMENTS

| AU | 490813 | 8/1977 |
|---|---|---|
| CN | 2403461 | 2/2000 |

(Continued)

*Primary Examiner* — Benjamin Layno
(74) *Attorney, Agent, or Firm* — Miller Law Group, PLLC

(57) ABSTRACT

A games table features a unique corner assembly in which upper and lower corner members respectively embrace about upper and lower edges of an elongated perimeter frame member of the table and are clamped together to secure the frame member in place around a primary gameplay panel. Matable male and female features on the corner assemblies also enable stacking of two table top units to enable convenient switching of a games table between two modes of game play. Invertible caps of the corner units feature braces capable of receiving a second horizontal gameplay panel in a position over the primary gameplay panel. The main gameplay panel is double sided, whereby Inversion of the entire tabletop unit enables a second mode of gameplay. Alternatively, support arms of an upright gameplay unit featuring a basketball backboard or other upright panel are insertable into the corner units.

15 Claims, 16 Drawing Sheets

Related U.S. Application Data

(60) Provisional application No. 62/281,950, filed on Jan. 22, 2016.

(51) Int. Cl.
| | | |
|---|---|---|
| A63B 67/04 | (2006.01) | |
| A63F 11/00 | (2006.01) | |
| A63B 63/08 | (2006.01) | |
| A63F 9/02 | (2006.01) | |
| A63F 7/00 | (2006.01) | |
| A47B 25/00 | (2006.01) | |
| A63F 3/00 | (2006.01) | |

(52) U.S. Cl.
CPC ............ *A63F 7/066* (2013.01); *A63F 7/0612* (2013.01); *A63F 7/0616* (2013.01); *A63F 7/0672* (2013.01); *A63F 9/02* (2013.01); *A63F 11/00* (2013.01); *A47B 3/06* (2013.01); *A47B 25/00* (2013.01); *A47B 25/003* (2013.01); *A63F 2003/0017* (2013.01); *A63F 2003/00164* (2013.01); *A63F 2003/00167* (2013.01); *A63F 2003/00233* (2013.01); *A63F 2003/00236* (2013.01)

(58) Field of Classification Search
CPC .... A63F 2003/00167; A63F 2003/0017; A63F 2003/00233; A63F 2003/00236
USPC ........ 273/309, 285, 287, 284; 473/4, 10, 14, 473/15
See application file for complete search history.

(56) References Cited

U.S. PATENT DOCUMENTS

| | | | |
|---|---|---|---|
| 3,001,843 A * | 9/1961 | Davis .................... | A47B 25/00 108/11 |
| 3,088,740 A | 5/1963 | Erickson | |
| 3,931,970 A | 1/1976 | Cecchetti | |
| 4,413,570 A | 11/1983 | Haigh | |
| D327,928 S | 7/1992 | Cochran | |
| 5,630,760 A | 5/1997 | Brown et al. | |
| 5,752,886 A | 5/1998 | Tien | |
| 5,941,183 A * | 8/1999 | Ming-Shun .............. | A47B 3/06 108/153.1 |
| 6,120,030 A * | 9/2000 | Chou ................... | A63F 3/00157 273/284 |
| 6,155,564 A | 12/2000 | Tsai | |
| 6,349,939 B1 * | 2/2002 | Tsai ......................... | A63F 7/06 273/108.1 |
| 6,419,224 B1 | 7/2002 | Tsai | |
| 6,623,004 B2 | 9/2003 | Rossi et al. | |
| 7,387,299 B1 | 6/2008 | Voden | |
| D608,848 S | 1/2010 | Quinn | |
| 2007/0037628 A1 | 2/2007 | Pearson et al. | |
| 2007/0216101 A1* | 9/2007 | Padilla .................. | A63B 67/04 273/309 |
| 2015/0091249 A1 | 4/2015 | Nally | |
| 2016/0015177 A1* | 1/2016 | Blake .................. | A47B 87/002 108/64 |

FOREIGN PATENT DOCUMENTS

| | | |
|---|---|---|
| CN | 200963513 | 3/2006 |
| CN | 101534676 | 9/2009 |
| CN | 100567746 | 12/2009 |
| CN | 201982432 | 9/2011 |
| CN | 202700085 | 1/2013 |
| CN | 202820192 | 3/2013 |
| DE | 29616635 | 12/1996 |
| DE | 10051270 | 4/2002 |
| DE | 202005003901 | 8/2006 |
| EP | 0362584 | 8/1993 |
| FR | 89961 | 9/1967 |
| FR | 2470889 | 6/1981 |
| FR | 2738467 | 3/1997 |
| WO | 2005/035075 | 4/2005 |

* cited by examiner

Fig. 1A
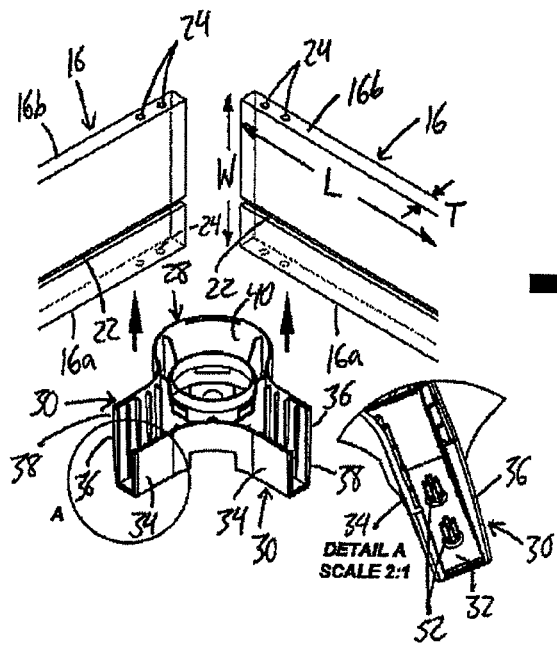
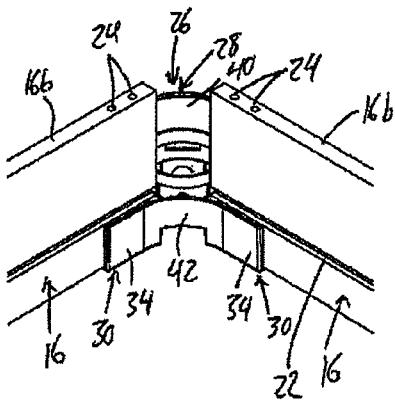
Fig. 1B
Fig. 2B
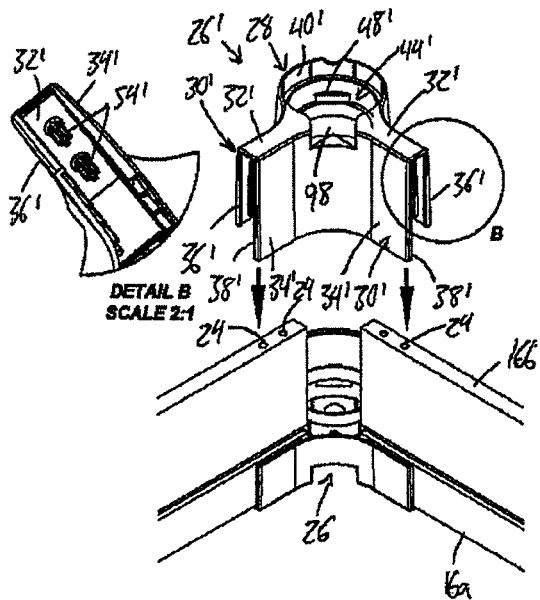
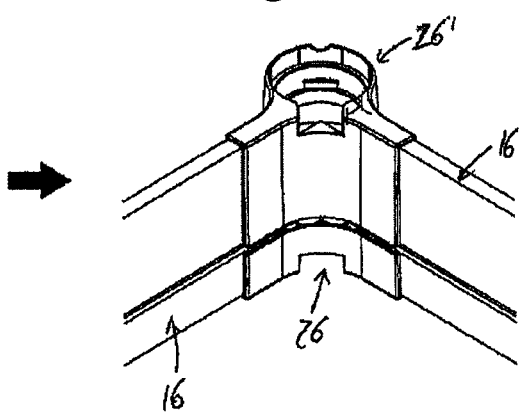
Fig. 2B

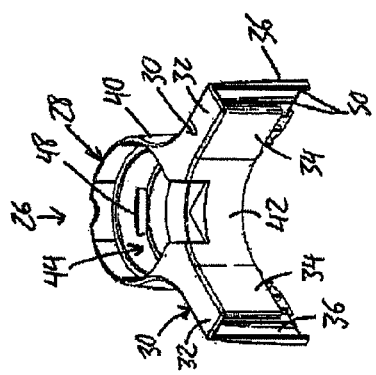
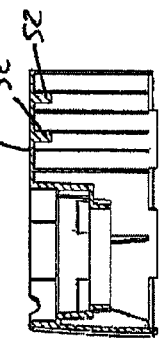
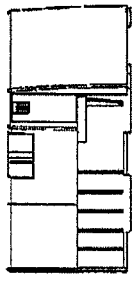
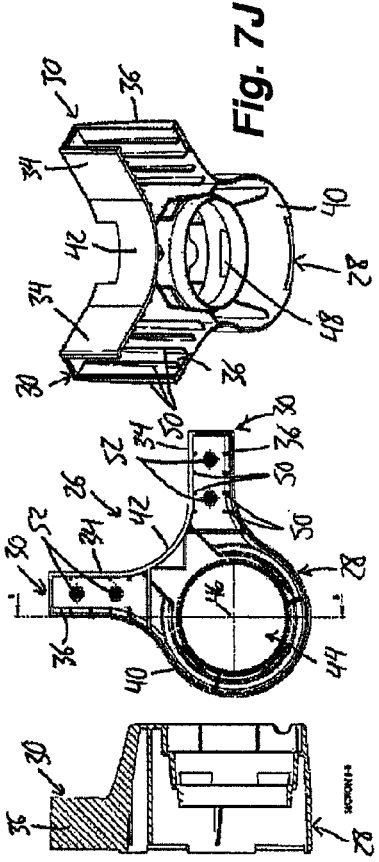
*Fig. 7C* *Fig. 7H* *Fig. 7I* *Fig. 7J*
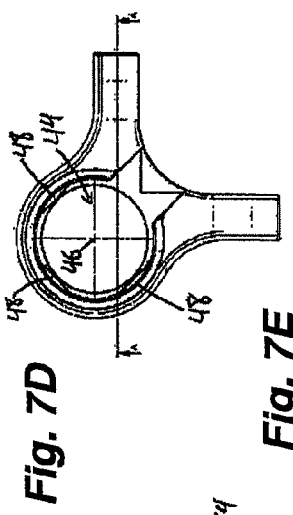
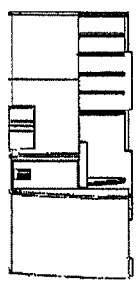
*Fig. 7D* *Fig. 7E* *Fig. 7G*
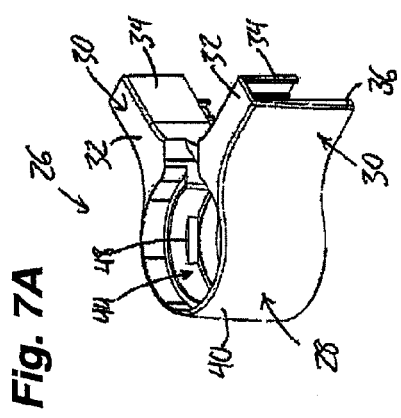
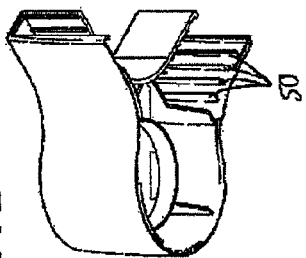
*Fig. 7A* *Fig. 7B* *Fig. 7F*

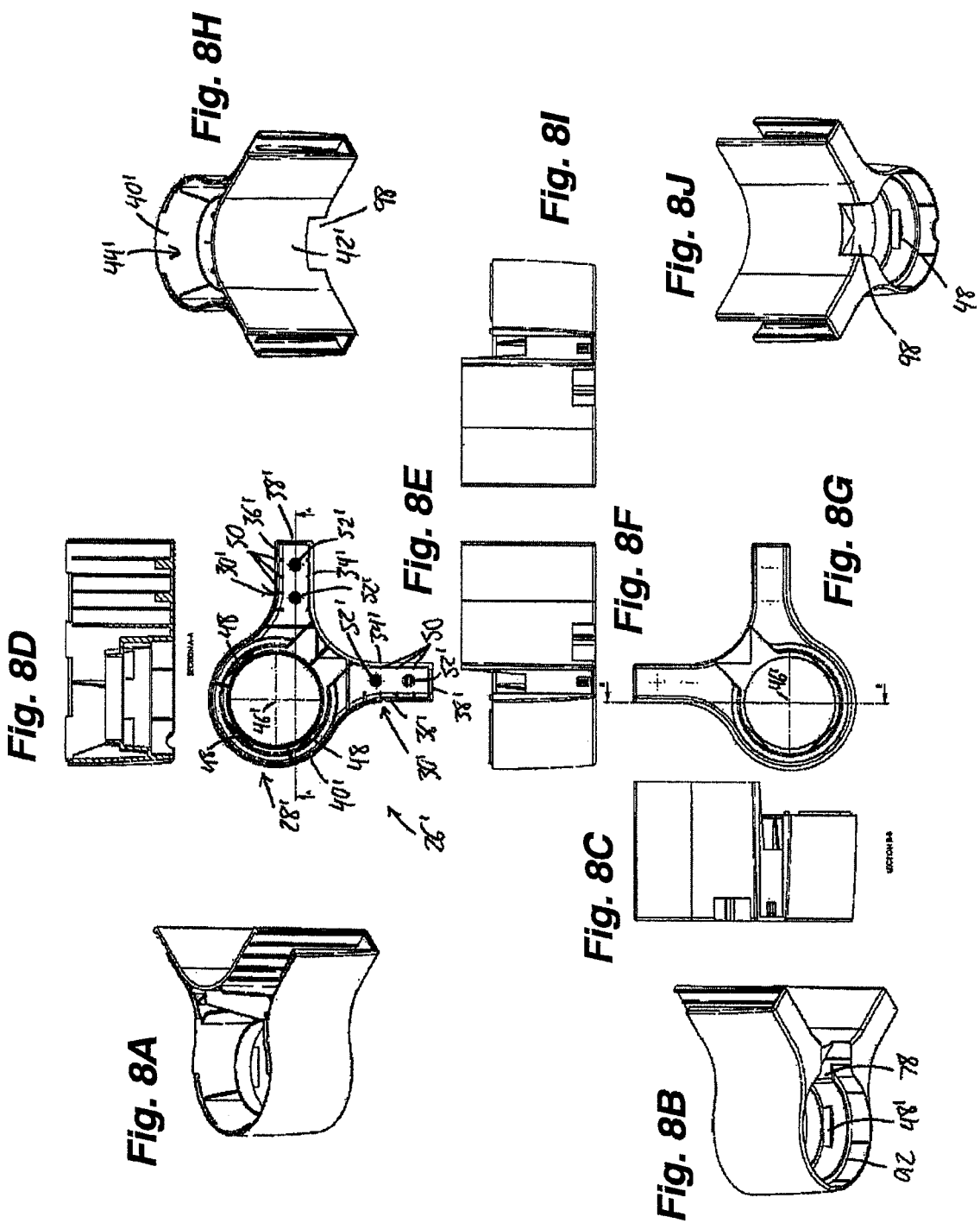

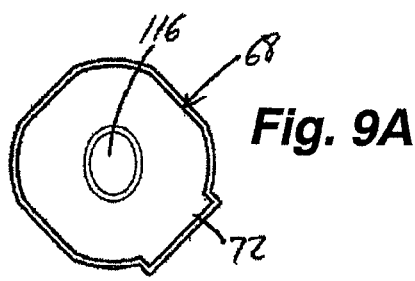
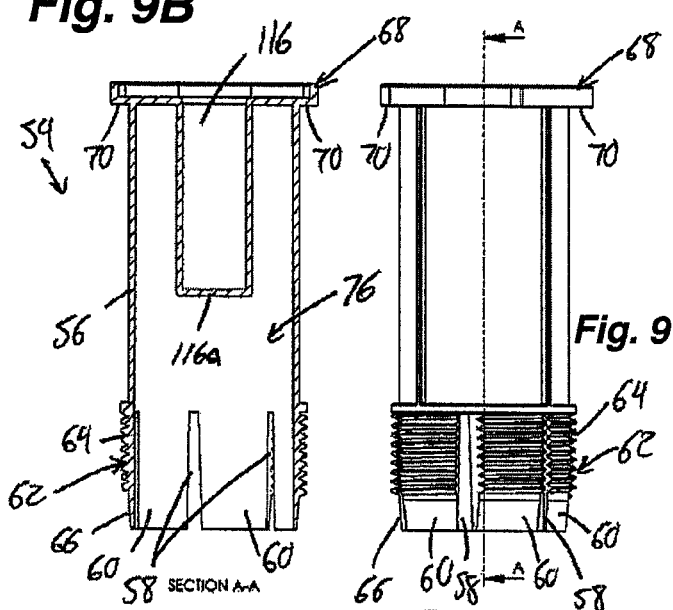
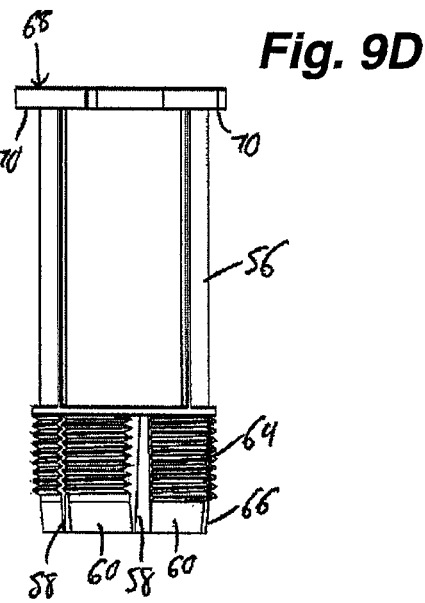
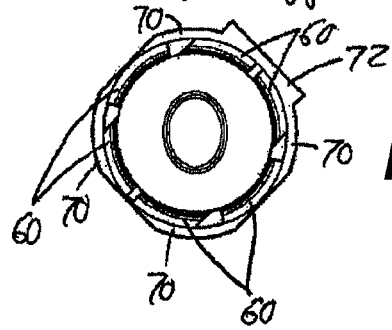

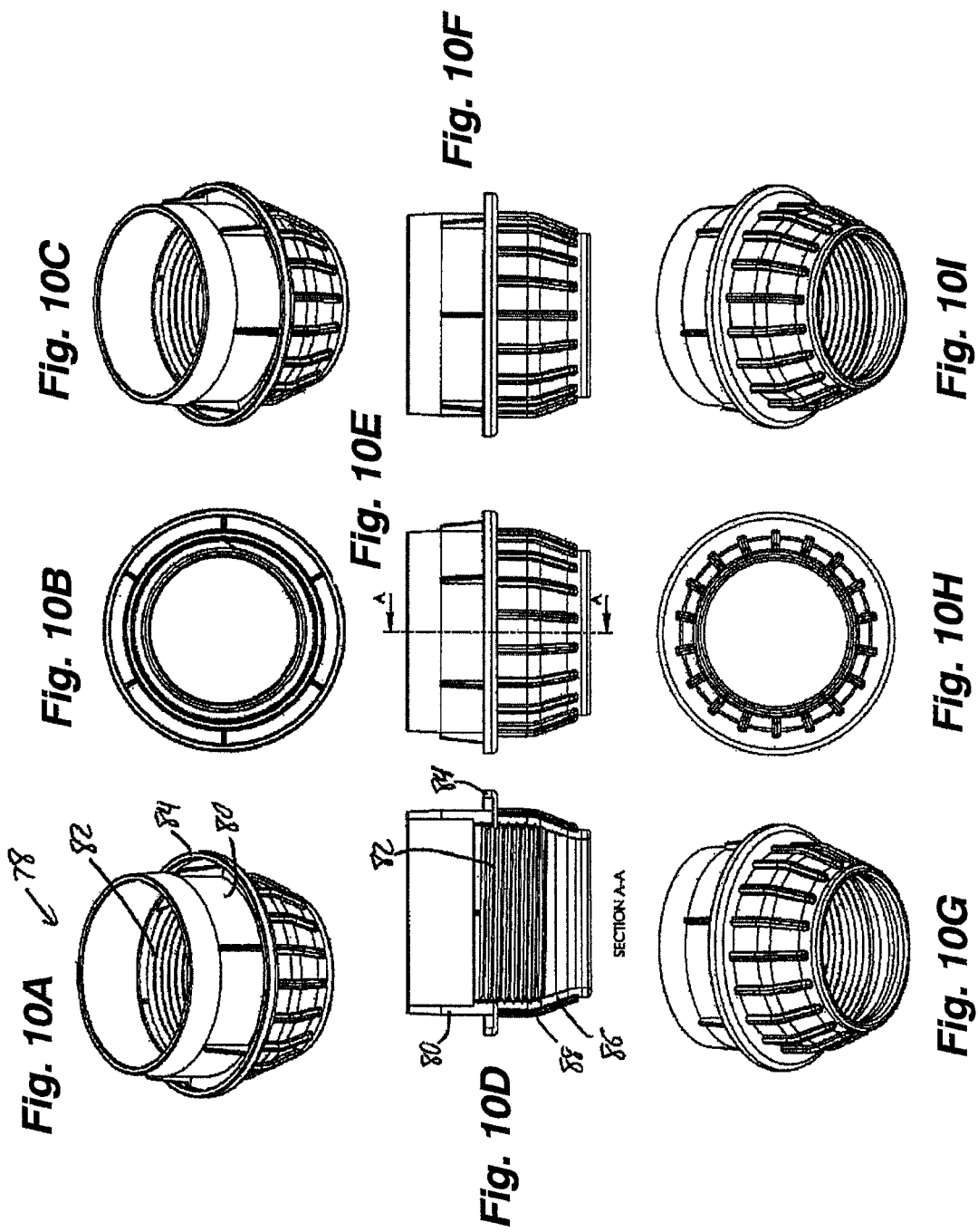

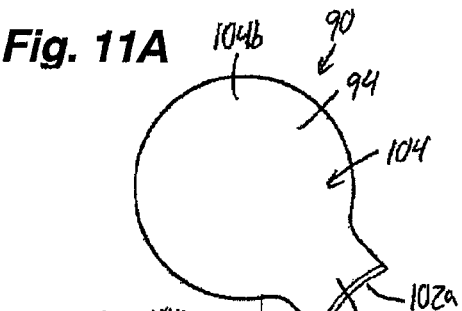
Fig. 11A
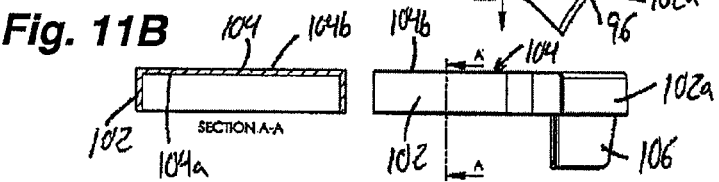
Fig. 11B
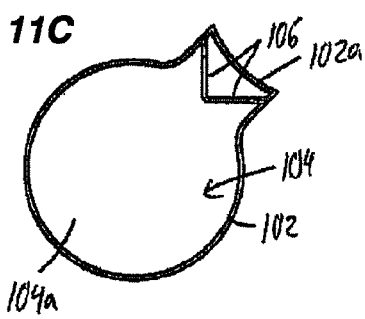
Fig. 11C
Fig. 11D
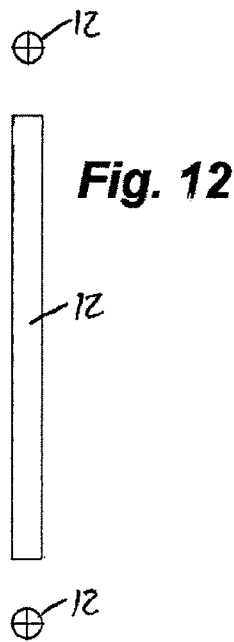
Fig. 12
Scale 1:4
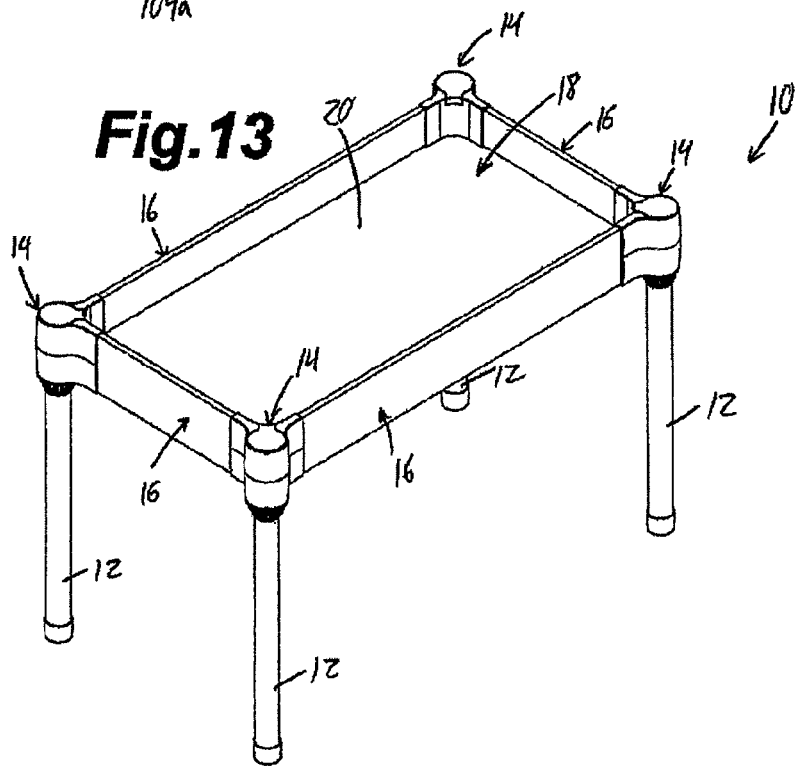
Fig. 13

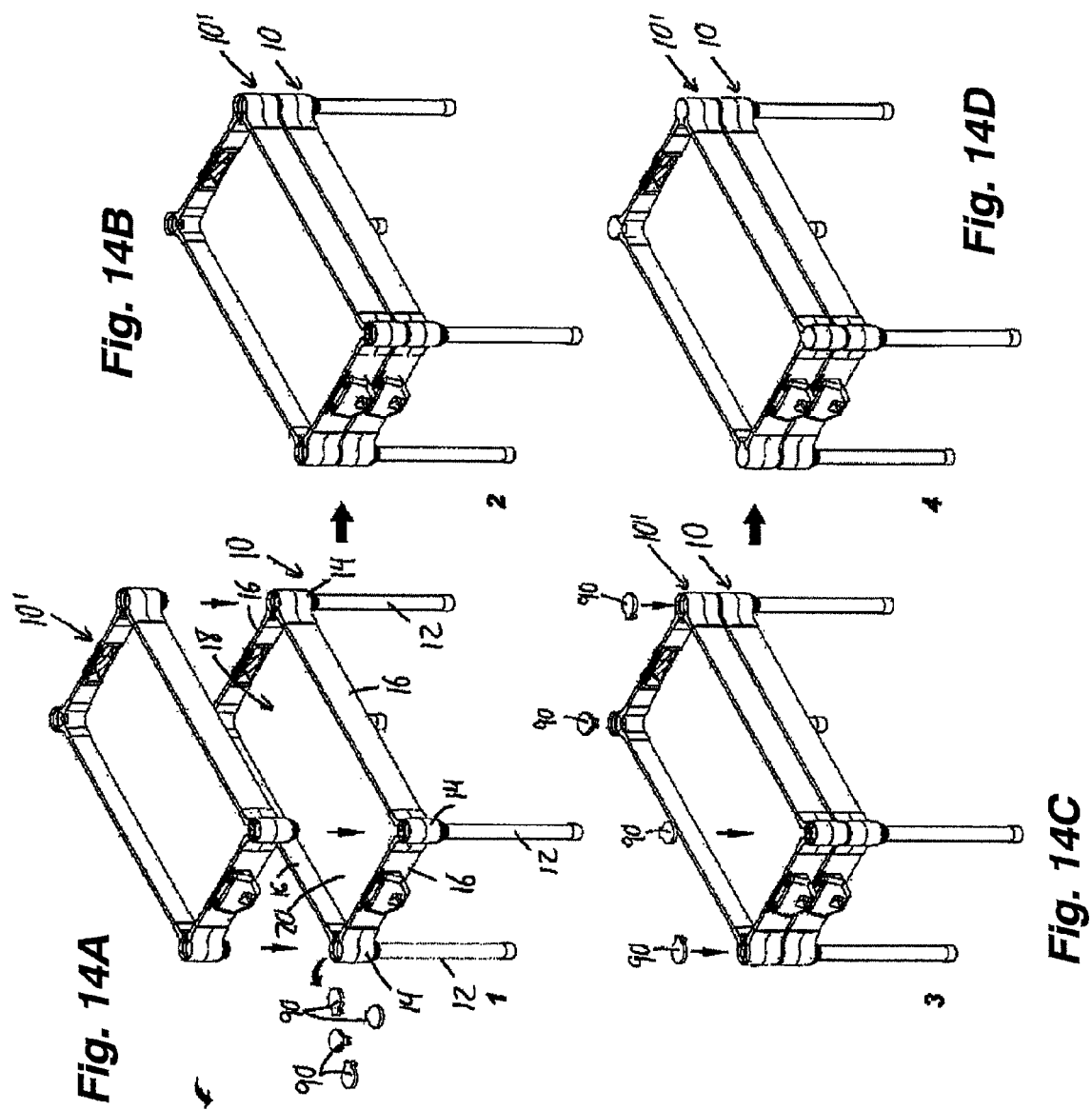

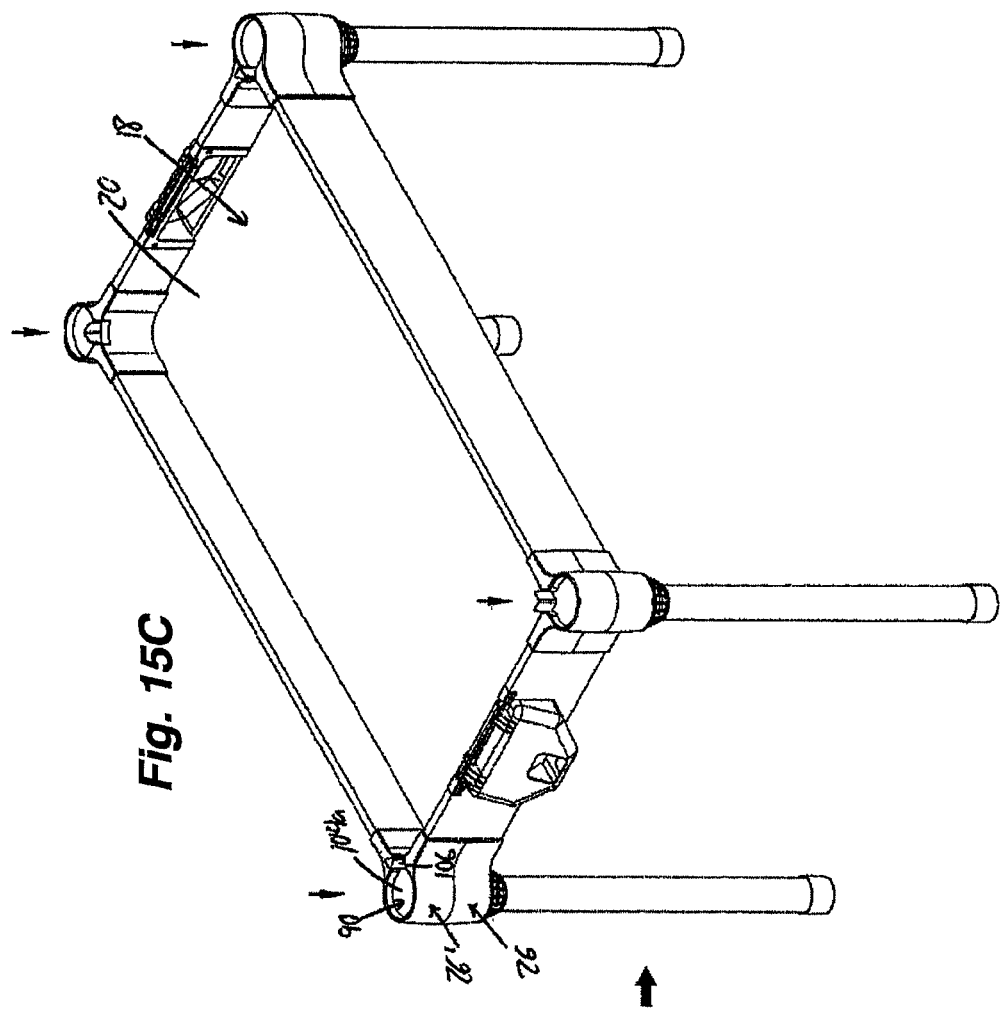
*Fig. 15C*
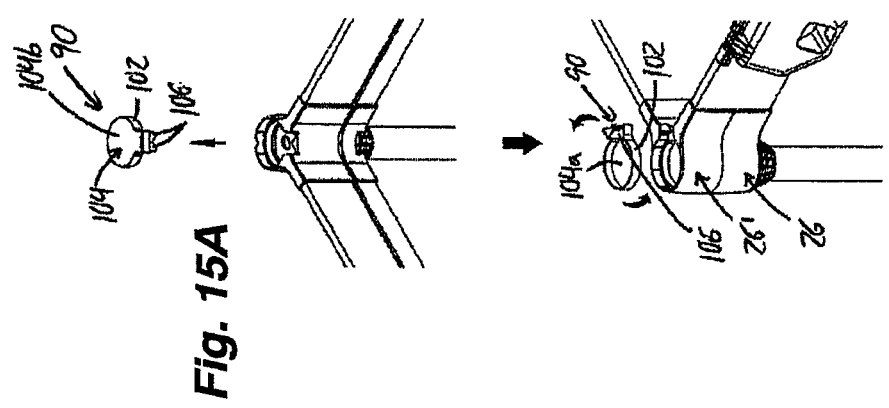
*Fig. 15A*
*Fig. 15B*

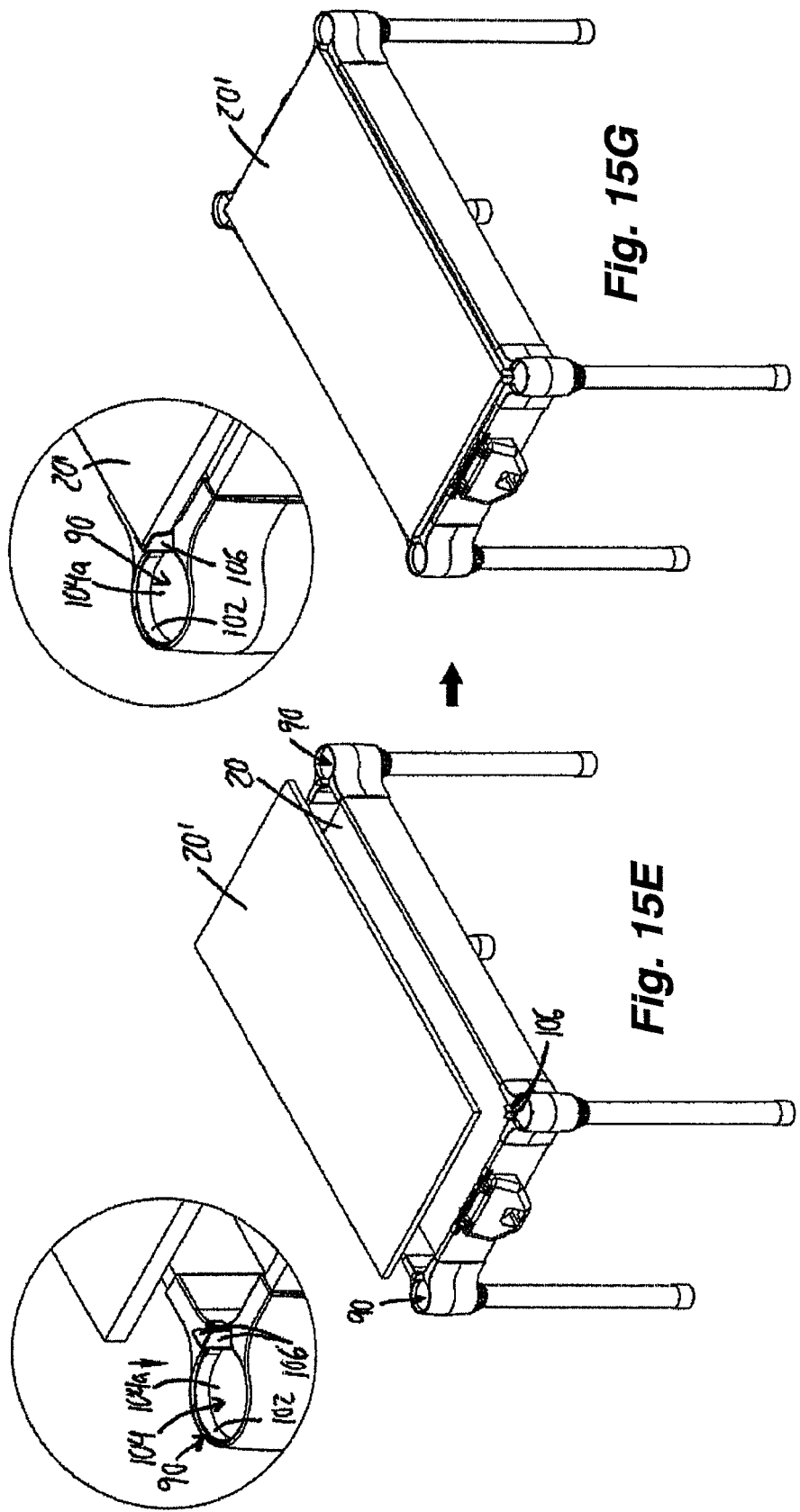

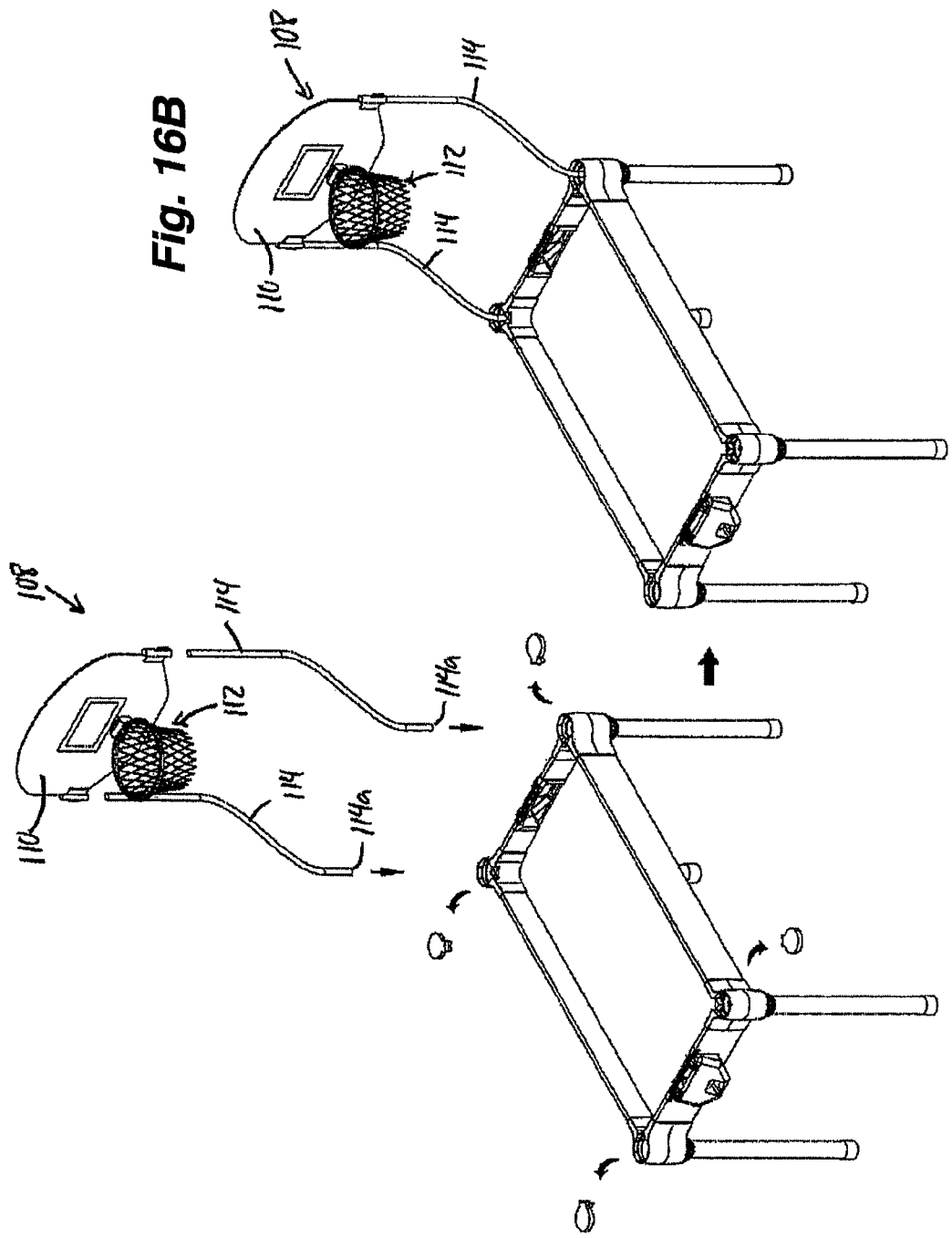

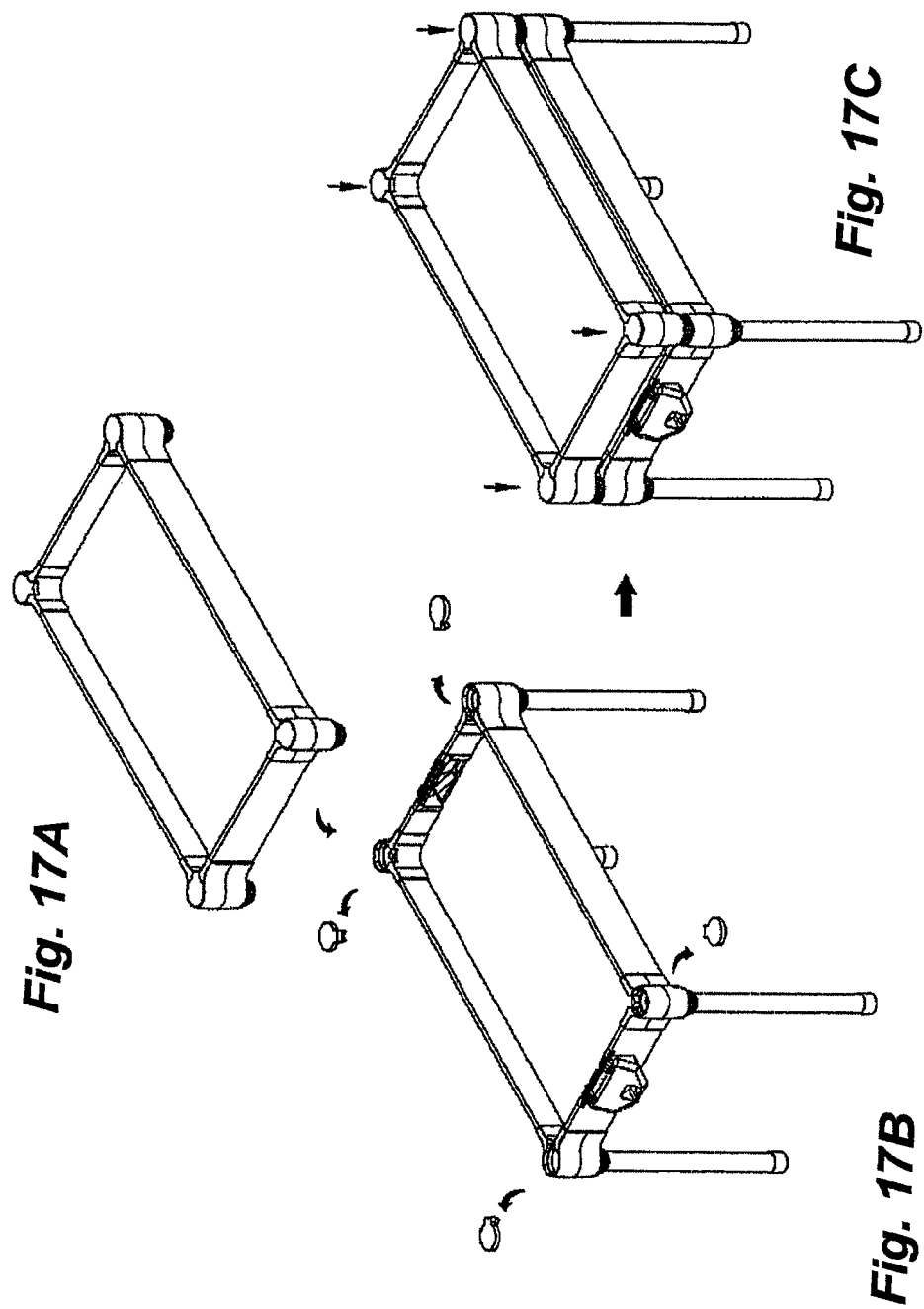

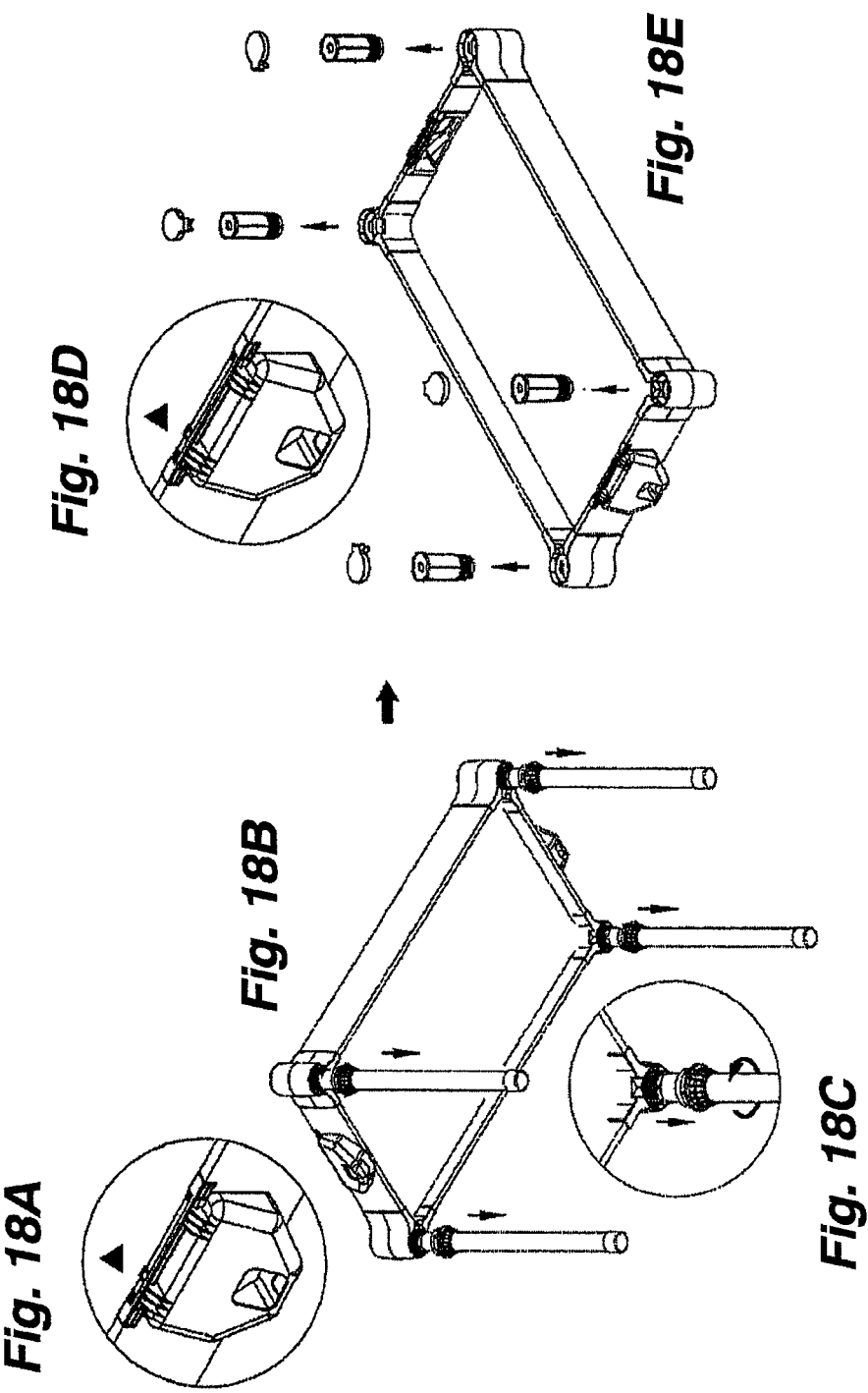

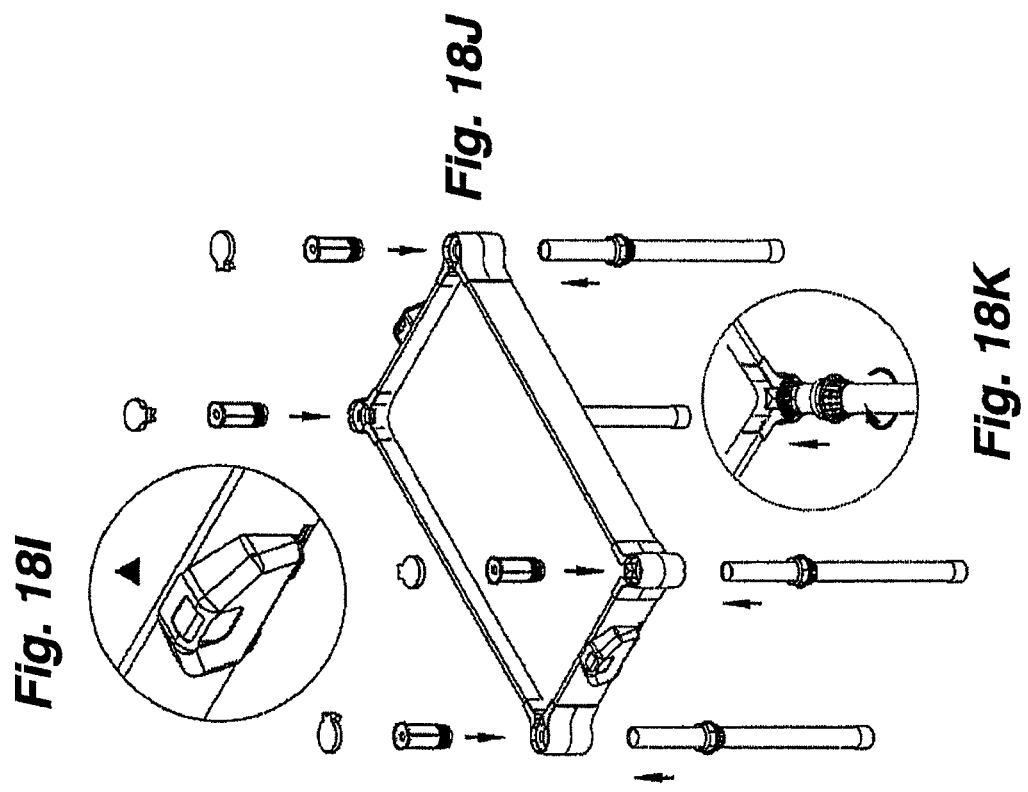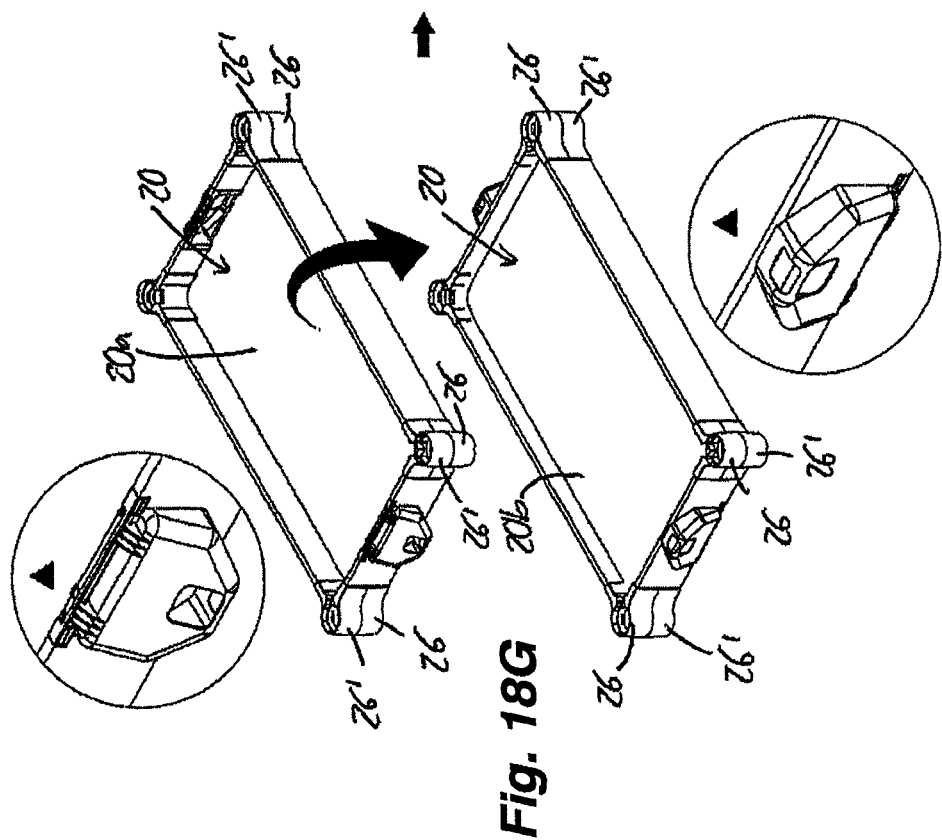

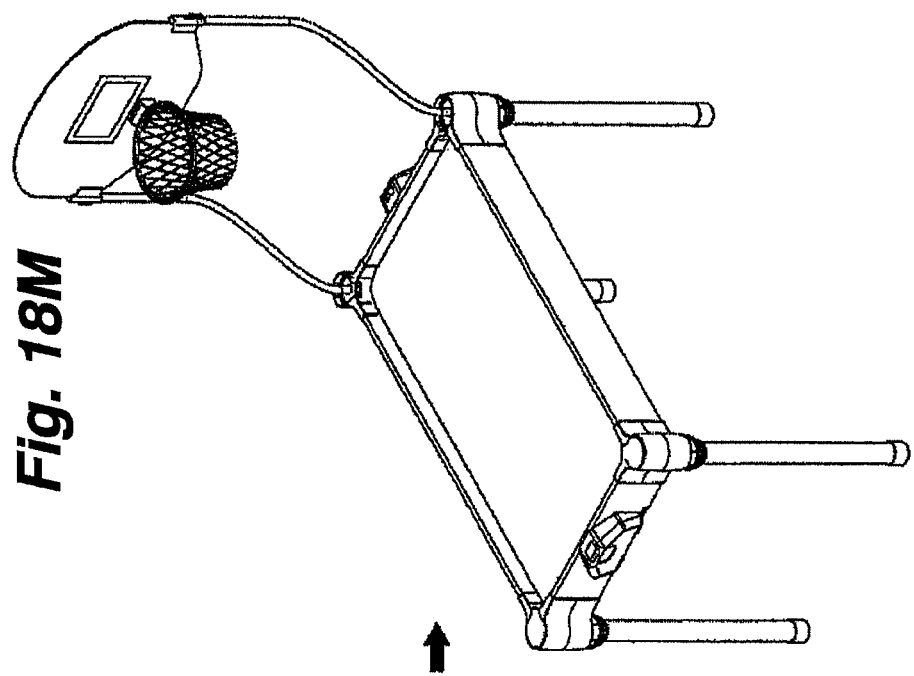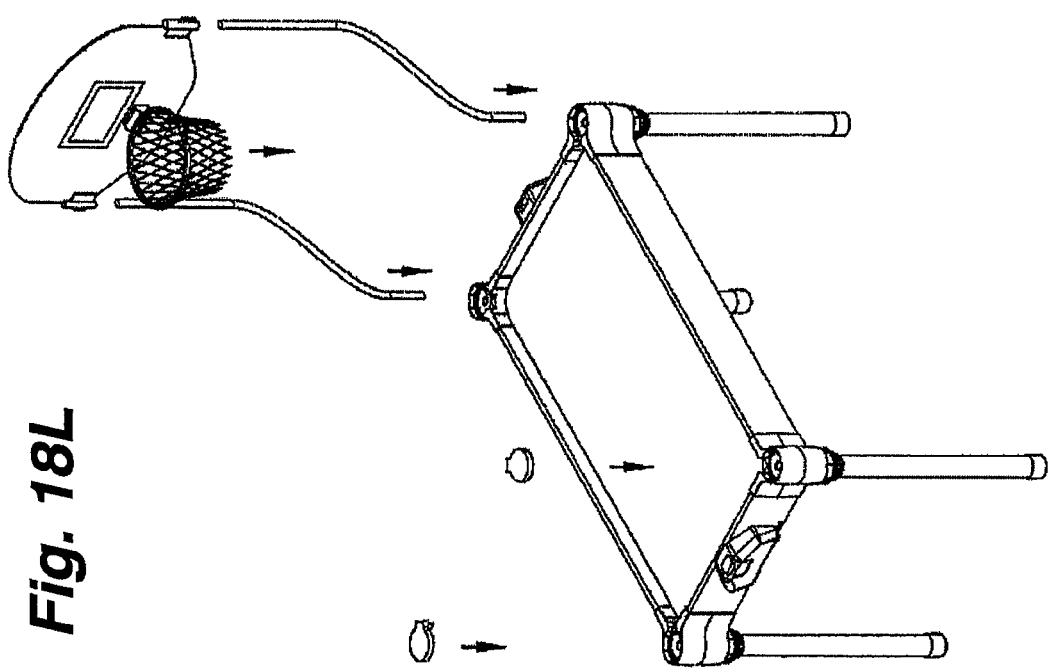

GAMES TABLES AND CORNER ASSEMBLIES FOR SAME

CROSS REFERENCE TO RELATED APPLICATIONS

This application is a divisional application of U.S. Nonprovisional application Ser. No. 15/363,962, filed Nov. 29, 2016, which claims benefit under 35 U.S.C. 119(e) of Provisional Application Ser. No. 62/281,950, filed Jan. 22, 2016, both of which are incorporated herein by reference in their entirety.

FIELD OF THE INVENTION

The present invention relates generally to games tables, and more particularly to a games table with a unique corner assembly in which upper and lower corner members respectively embrace about upper and lower edges of an elongated perimeter frame member of the table and are clamped together to secure the frame member in place. Matable male and female features on the corner assemblies also enable stacking of two table top units to enable convenient switching of a games table between two modes of game play.

BACKGROUND

Games tables have long been known and widely used. This includes foosball (otherwise known as table football, table soccer, and several other names), billiards or pool, air hockey, and many others. Traditionally, these tables are made from either a wood or plastic frame, where 4 walls are attached together using nails or screws, and 4 legs are then attached to each corner also using nails or screws to elevate the height. These tables are traditionally sold non-assembled (i.e. flat-packed), so the end user needs to assemble the table themselves after purchasing it.

This historical design requires significant time to assemble. It requires the use or hammers and/or screwdrivers and/or Allen wrenches. Lower cost and mass market versions of these tables are also plagued by quality and workmanship issues whereby pre-drilled holes may not align perfectly and cause great hardship to the end-user to assemble the table. Once assembled, these tables take up a great amount of space as typically the legs cannot be easily removed without significant effort to unscrew the parts. As these tables are often used by children, the presence of nails and screws also creates a significant safety hazard. Many toy safety regulations prohibit the presence of sharp edges and points, including after conditioning treatment whereby the product is often broken apart.

Games tables can also be sold in both table and tabletop formats. Table format implies the presence of a set of legs (typically four) like a normal table, so that the unit is self-supporting and the game play surface is sufficient elevated for access by players typically in a standing position. Tabletop format implies the product is placed on a separate table to play, and either does not include legs or the legs are of very low height.

Games tables are incredibly popular all over the world, and there is desire for an improved design which will simplify assembly, improve safety, provide improved compactness and storability when not in use, and provide increased functionality easily used in either table or tabletop format.

The present disclosure provides an improved construction for a games table, greatly simplifying assembly, creating more functionality, improving safety, and allowing for more compact storage. The presently disclosed construction may be used for foosball (table football) tables, billiards or pool tables, air hockey tables, and other similar games tables, as well as multi games tables.

SUMMARY OF THE INVENTION

According to a first aspect of the invention, there is provided a games table apparatus comprising:
a set of elongated frame members for placement end-to-end with one another to form a frame for supporting a game play surface;
a set of corner assemblies each configured for coupling together a respective adjacent pair of said elongated frame members at a respective corner of the frame; and
a set of table legs each connectable to a respective one of the corner assemblies in a position depending downward therefrom to support the frame and the playing surface in an elevated position;
each corner assembly comprising:
an upper corner member having a first hub and a pair of open-bottom channels diverging outwardly from the first hub and arranged to embrace over upper edges of the adjacent pair of said elongated frame members at respective ends thereof; and
a lower corner member having a second hub and a pair of open-top channels diverging outwardly from the second hub and arranged to embrace around lower edges of the adjacent pair of said elongated frame members at respective ends thereof in alignment with the open-bottom channels that embrace over the upper edges of said adjacent pair of said elongated frame members; and
a tightening mechanism operable to force the upper corner member and the lower corner member toward one another against the upper and lower edges of the adjacent pair of said elongated frame members to clamp said adjacent pair of said elongated frame members together at the respective corner of the frame.

According to a second aspect of the invention, there is provided a games table apparatus comprising:
a set of table legs;
a table top unit comprising a set of elongated frame members that are situated end-to-end around a first game play area, and a plurality of corner units that each interconnect a respective adjacent pair of the elongated frame members at a corner of the first game play area, an upper end of each corner unit having a female opening therein at an upper end thereof and the corner units being connectable to the table legs for elevated support of the first game play area by said table legs;
a second game unit defining a second game related area and comprising at least one male insertion feature that is insertable downwardly into the female opening in the upper end of a respective one of the corner units to mate the male insertion with said respective one of the corner units in a manner supporting the second game related area in an elevated relation the first game play area.

According to a third aspect of the invention, there is provided a games table apparatus comprising:
a frame comprising a set of elongated frame members situated end-to-end around a game play area and a plurality of corner units each interconnecting a respective adjacent pair of the elongated frame members at a corner of the game play area;

a respective corner brace standing or standable upwardly from each corner unit;

a primary game play surface supported within said game play area for use in a first mode of gameplay; and a secondary game play panel arranged for selective placement over the primary game play area in a useful position braced between the corner braces of the corner units to define a secondary game play surface for use in a second mode of gameplay.

According to a fourth aspect of the invention, there is provided a games table apparatus comprising:

a frame comprising a set of elongated frame members situated end-to-end around a game play area and a plurality of corner units each interconnecting a respective adjacent pair of the elongated frame members at a corner of the game play area;

a double-sided game play panel supported in the game play area by the frame; and a set of table legs;

wherein each corner unit comprises hollow axial passages extending thereinto from both top and bottom ends thereof, each hollow axial passage being sized to accommodate receipt of an upper end of one of the table legs therein, whereby the frame is invertible between a first-side-up orientation mounted atop the table legs with a first side of the double-sided game play panel facing upward for a first mode of game play on said first side of the double-sided game play panel, and a second-side-up orientation mounted atop the table legs with a second side of the double-sided game play panel facing upward for a second mode of game play one said second side of the double-sided game play panel.

According to a fifth aspect of the invention, there is provided a games table apparatus comprising:

a set of elongated frame members for placement end-to-end with one another to form a frame for supporting a game play surface;

a set of table legs;

a set of corner units each configured for coupling together a respective adjacent pair of said elongated frame members at a respective corner of the frame, each corner unit comprising a split collet body having external threads and a downwardly-opening hollow interior sized for sliding receipt of a respective one of the table legs therein; and a respective threaded collar for each table leg, the collar being slidable along the table leg and having internal threads matable with the external threads of the respective collet body, whereby rotation of the respective collar around the table leg in an advancing direction while in threaded engagement with the collet body tightens said split collet body around said table leg to clamp said table leg in place.

BRIEF DESCRIPTION OF THE DRAWINGS

One embodiment of the invention will now be described in conjunction with the accompanying drawings in which:

FIG. 1A is a perspective view illustrating installation of a lower corner member of a games table corner assembly on a pair of adjacent frame members of the games table.

FIG. 1B is a perspective view showing the lower corner member of FIG. 1A in its installed position on the adjacent frame members.

FIG. 2A is a perspective view illustrating installation of a corresponding upper corner member with the lower corner member and adjacent perimeter frame members of FIG. 1B.

FIG. 2B is a perspective view showing the lower corner member of FIG. 2A in its installed position on the adjacent perimeter frame members.

FIGS. 7A through 7J illustrate elevational, top, bottom, cross-sectional and perspective views of the upper corner member.

FIGS. 8A through 8jJ illustrate elevational, top, bottom, cross-sectional and perspective views of the lower corner member.

FIGS. 9A through 9E illustrate elevational, top, bottom and cross-sectional views of the generally cylindrical insert.

FIGS. 10A through 10I illustrate elevational, top, bottom, cross-sectional and perspective views of the threaded collar.

FIGS. 11A through 11D illustrate top, bottom, elevational and cross-sectional views of the finishing cap.

FIG. 12 illustrates an elevational view of the upright table leg.

FIG. 13 is a perspective view of a fully assembled games table employing four corner assemblies of the type illustrated in FIG. 6.

FIGS. 14A through 14D illustrate a first games table whose corner assemblies having been assembled without upright table legs, and which is stacked atop a second leg-supported games table to switch between two different game playing modes.

FIGS. 15A through 15C illustrate optional inverted installation of the finishing caps of FIGS. 6 and 11.

FIGS. 15D through 15G illustrate use of the inverted finishing caps of FIG. 15a to support a secondary game play panel over the primary game play area using corner braces that stand upwardly from the inverted finishing caps.

FIGS. 16A and 16B illustrate optional removal of the finishing caps to support a secondary game unit in a position standing upward from the two corner units at one end of the games table.

FIGS. 17A through 17C illustrate stacking of a legless games table assembly atop a leg-quipped table assembly, as similarly shown in FIG. 14.

FIGS. 18A through 18M illustrate an invertibility of the games table, whereby a double-sided game play panel and associated frame can be mounted to the upright table legs in either one of two inverted orientations to enable two modes of game play from a singular games table.

In the drawings like characters of reference indicate corresponding parts in the different figures.

DETAILED DESCRIPTION

Figure 3A:
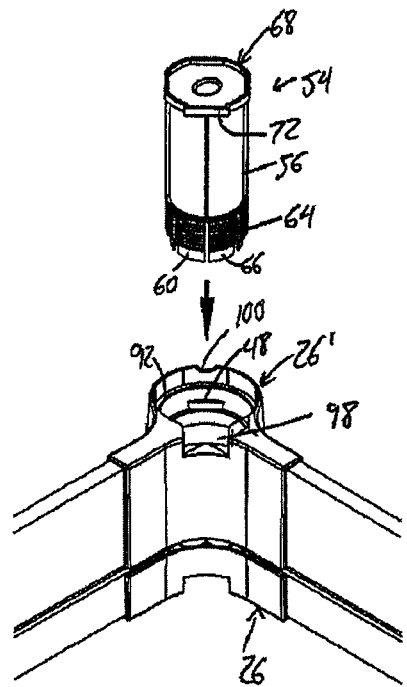
FIG. 3A is a perspective view illustrating installation of a generally cylindrical insert into aligned hubs of the upper and lower corner members of FIG. 2B.

FIG. 13 shows a fully assembled games table 10 constructed in accordance with the present invention. In brief, the games table 10 features four upright legs 12 respectively coupled to four corner units 14, which in turn are used to connect together four elongated perimeter frame members 16 that delimit a rectangular game play area 18 in which a horizontal panel 20 is supported by the frame members 16 to define a game play surface at a topside of the panel within the confines of the frame members 16. The frame members 16 thus define perimeter side walls or barriers around the game play surface. This general structure may form the basis for any number of different types of gaming table, including, but not limited to, a foosball table where control rods are slidably supported by an opposing pair of the frame members 16 and goal openings are provided at the other opposing pair of the frame members, a pool or billiards table where pockets are provided at the corners of the game play surface just inside the corner units and at the midpoints of two opposing frame members, and an air hockey table in which goal openings are provided in an opposing pair of the frame members and an array of perforations are provided in the panel 20 and fed by a pressurized air source to create a cushion of air at the game play surface. In the illustrated embodiment, two of the four perimeter frame members 16 are longer than the other two in order to give the game play area an elongated rectangular shape. However the shape of the table may vary, for example including variation in the quantity of corner units, and variation in the quantity and relative dimensions of the frame members.

One particularly unique aspect of the games table is found in the structure and assembly of the corner units, which are now described in further detail with reference to FIGS. 1 to 6, which illustrate sequential steps in the assembly of each of the identical corner units 14, and FIGS. 7 to 11, which illustrate the individual components that are assembled to define the finished corner units.

FIG. 1 shows an adjacent pair of the frame members 16 which are placed in proximity to one another in an end-to-end relationship at ninety degrees to one another to denote two perpendicular sides of a rectangular game play area. Each frame member of the illustrated embodiment is in the form of a flat rectangular board that is elongated in a longitudinal length direction L relative to a smaller width dimension W, and an even smaller thickness dimension T, of the board. Each frame member 16 resides in respective vertical pane with its length and width dimensions oriented respectively horizontally and vertically in this plane, and its thickness dimension oriented horizontally and perpendicularly transverse to this vertical plane. A longitudinal slot 22 spans the full length dimension L of each board on an interior side thereof that faces into the game play area 18 of the table in the fully assembled state thereof. The slot 22 resides nearer to a longitudinally oriented lower edge 16a of the frame member 16 than to a parallel longitudinally oriented upper edge 16b thereof. Near each end of each frame member 16, a respective pair of blind holes 24 extends into each of the lower and upper edges 22a, 22b of the frame member 16.

With continued reference to FIG. 1, each corner assembly includes a lower corner member 26 that features a hub 28 from which two open-top channels 30 diverge outwardly at ninety degrees to one another for respective mating with the lower edges 16a of the adjacent frame members. The angle of divergence of the frame members and the channels is ninety degrees in the illustrated embodiment where the play area is rectangular, but the angle may vary in other embodiments where the play area varies in shape and the corresponding number of corners. The lower corner member 26 is shown in isolation with greater detail in FIG. 7. Each open-top channel 30 features a bottom wall 32 and inner and outer side walls 34, 36 that stand vertically upright at opposing sides of the bottom wall 32. Each channel 30 is open at the distal end 38 thereof situated opposite the hub from which the channel extends. The hub 28 features a cylindrically contoured outer wall 40 interconnecting the outer side walls 36 of the two channels 30 in a manner bulging convexly outward therefrom. The inner side walls 34 of the two channels are integrally joined by a concavely arcuate wall span 42. A hollow axial passage 44 extends through the hub on the central axis 46 of the outer wall's cylindrical contour. This central axis 46 of the hub is offset outwardly from the intersection point of the longitudinal axes of the two open-top channels 30. A set of three support flanges 48 jut into the hollow axial passage 44 from the outer wall 40 of the hub 28 at ninety degree intervals around the central axis 46 of the hub for reasons set out herein further below. One of these flanges 48 resides diametrically across the hollow axial passage 44 from the arcuate wall span 42.

Gripping ribs 50 or fins are provided on both the inner and outer side walls 34, 36 of each open-top channel 30 at regularly spaced intervals therealong. Each gripping rib or fin spans the height of the respective side wall of the channel in a vertical direction parallel to the central hub axis 46. Two column-shaped protrusions 52 protrude vertically upward from the bottom wall 32 of each open-top channel 30. These protrusions 52 are spaced-apart from one another in the longitudinal direction of each channel by the same center-to-center distance as the two blind holes 24 in the lower edge 16a each of the frame members 16, and are sized to enable insertion of these protrusions into these blind holes 24. To accommodate this, a width of each open-top channel 30 measured perpendicularly between its parallel side walls 34, 36 slightly exceeds the thickness dimension T of each frame member 16. The perpendicular distance between the gripping ribs or fins 50 on these side walls however is equal to or slightly less than the thickness of each frame member 16, whereby slipping of the open-top channels 30 over the lower edge 16a of the respective frame member 16 provides a snug fit of the lower corner member 26 on the frame member 16 due to a slight interference fit therebetween, whereby the ribs or fins 50 on the opposing sides of the channel frictionally grip the interior and exterior sides of the frame member 16. The lower corner member is a molded plastic part, and the frame members may be wooden boards, whereby the distal tips of the ribs or fins 50 are flexible or compressible to accommodate slight variations in the frame member thickness 16 and provide a snug friction fit therewith. The protrusions 52 may have a split-column shape, for example split by two perpendicularly crossing slots, to provide some radial compressibility to ensure the protrusions will fit within the blind holes 24 regardless of slight variations in the size or position of the preferably pre-drilled blind holes 24.

The outer side wall 36 of each open-top channel is taller than the inner side wall 34 in a vertical height or depth direction measured perpendicularly to the bottom wall 32 of the open-top channel. Specifically, the height of the inside wall is equal to or slightly less than the distance from the lower edge 16a of the respective frame member 16 to the longitudinal slot 22 therein. With reference to FIG. 1, the lower corner member 26 is slipped upwardly into engagement with the two frame members 16 from therebeneath such that the protrusions 52 of each open-top channel 30 are inserted into the blind holes 24 in the lower edge 16a of the respective frame member and the walls 32, 34, 36 of the open-top channel embrace about the lower edge 16a of the frame member. The frictional fit of each open-top channel 30 on the respective frame member holds the lower corner member in place on the frame members while other corner unit components are subsequently installed in the manner described below, and the mating receipt of the protrusions 52 in the blind holes of the frame members prevent the frame members 16 from sliding longitudinally out of the open distal ends 38 of the open-top channels 30. As shown in FIG. 1B, the shorter height of the inside wall of each open-top channel prevents the channel from blocking access to the longitudinal slot 22 at the interior side of the respective frame member 16 for reasons set out herein further below.

Turning to FIG. 2, each corner unit also features an upper corner member 26' of substantially the same structure and configuration as the lower corner member 26, but employed in an inverted orientation relative thereto so that its two channels are open-bottom channels 30' with closed top walls 32' rather than open-top channels with closed bottom walls. The protrusions 52' of the upper corner member 26' thus project vertically downward from its top wall 32'. Unlike the illustrated lower corner member, the channels 30' of the upper corner member of the illustrated embodiment don't feature shortened inner side walls, as the position of the longitudinal slot 22 near the lower edge 16b of each frame member 16 means that the inner side wall 34' of each channel of the upper corner member 26' can span more than half of the frame member's vertical height (i.e. the frame member's width dimension W) without interfering with the slot 22. As shown, the inner side wall 34' of each channel of the upper corner member 26' may actually exceed the outer side wall 36' in height, whereby the height of the open-bottom channel 30' is greater at the inner side than at the outer side.

In the illustrated embodiment, the outer side walls 36/36' of each corner member 26/26' have a height that is half of the height (width dimension W) of each frame member 16 so that when the upper and lower corner members are fitted over the upper and lower edges 16b, 16a of the frame member 16 respectively, the outer side walls 36, 36' of the two corner members abut one another at their distal edges. The height of the illustrated hub 28/28' of each corner member 26/28 equals the height of the outer side walls 36/36' of the channels 30/30', and so the both the outer side walls 36/36' of the channels and the outer walls 40/40' of the hubs 28/28' abut one another at a horizontal plane cutting through the frame members 16 at a vertically-centered height thereon. In other embodiments, the relative sizing of the channel side walls of the upper end lower corner members may vary from that of the illustrated embodiment. For example, the two side walls of each channel could be equal in height, and the outer side walls of the two corner member's need not necessarily meet one another.

Being of similar configuration, but inverted orientation, relative to the lower corner member, the upper corner member 26' features a respective hub 28' with an outer wall 40' concentrically spanning about a central hub axis 46' to enclose a respective axial through passage 44', two open-bottom channels 30' reaching outward from the hub to open distal ends 38', an arcuate wall span 42' joining together the inner side walls 34' of the channels 30', support flanges 48' jutting into the axial through-passage from the outer hub wall, and gripping ribs or fins 50' on the side walls 34', 36' of the channels. As shown in FIG. 2B, the upper corner member is fitted over the adjacent pair of frame member 16 to insert the protrusions 52' of the open-bottom channels 30' into the blind holes 24 in the upper edges 16b of the adjacent frame members 16 so that the open-bottom channels 30' embrace the upper edge 16b of the frame members in alignment with the open-top channels 30 that embrace the lower edges 16a of the frame members 16.

Figure 3B:
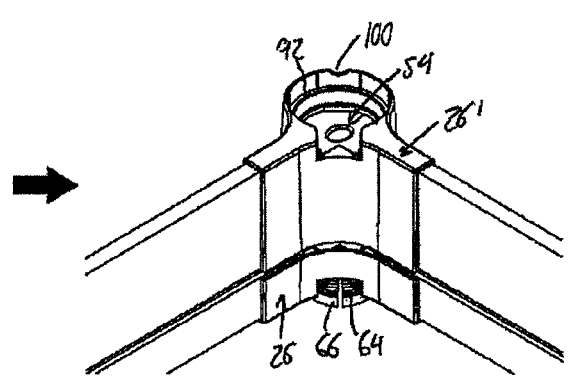
FIG. 3B is a perspective view showing the generally cylindrical insert of FIG. 3A in its installed position seated within the hubs of the upper corner member.

Turning now to FIG. 3, with the upper and lower corner members 26, 26' in place, a generally cylindrical insert 54 is inserted into a vertical through-bore that is defined by the aligned hollow axial passages 44, 44' of the installed upper and lower corner members 16, 16'. The insert 54 features a hollow cylindrical body 56 spanning a substantial majority of the insert's axial height. A lower portion of the cylindrical body 56 features a set of axial slots 58 that split the body 56 into separated arcuate sections 60 that span respective portions of a circumferential path around the body's central longitudinal axis, thereby defining a split collet body at a lower portion of 62 of the insert near the bottom end thereof. The collet body features external threading 64, which may start a short distance upward from the insert's bottom end, and the collet body may taper in diameter moving downward toward the bottom end of the insert from the threaded area, as shown at tapered area 66. A head 68 of the insert at the top end of the cylindrical body 56 has enlarged diameter relative to the cylindrical body 56 in at least some directions so as to create an overhanging shoulder 70 at different sides of the insert for seating of this shoulder atop the inwardly jutting support flanges 48' of the upper corner member 26' when the insert is placed in the axial through-bore via the open top end of the axial passage 44' of the upper corner member's hub 28'.

Figure 4A:
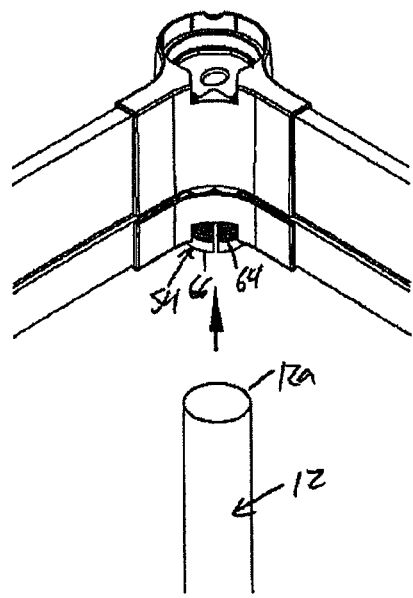
FIG. 4A is a perspective view illustrating coupling of an upright table leg to the generally cylindrical insert of FIG. 3B.
Figure 4B:
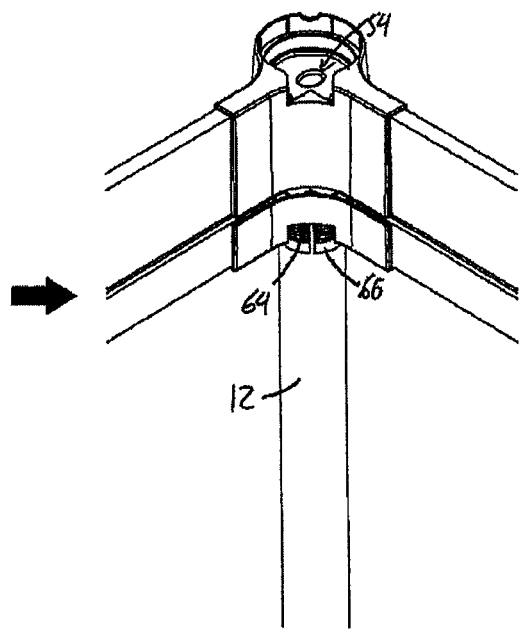
FIG. 4B is a perspective view showing the upright table leg of FIG. 4A in its installed position coupled to the generally cylindrical insert.

At one side of the insert, the head 68 features a stop tab 72 that juts further radially outward than the rest of the head 68. A boundary wall spanning around the hollow axial passage 44' of the upper corner member carries the support flanges 48' on the inner periphery thereof, and also features a circumferential gap 74 at the area between where the two open-bottom channels 30' extend outwardly from the hub 28 of the upper corner member. This gap 74 accommodates receipt of the insert's stop tab when the insert is lowered into this axial passage 44' and seated atop the support flanges 48'. This engagement of the stop tab 72 into the gap 74 prevents relative rotation between the insert and the upper corner member. As shown in FIG. 4B, in its seated position mated with the upper corner member, the insert reaches downwardly into and through the lower corner body 26 so that the externally threaded collet body near the bottom end of the insert 54 resides at least partially below the lower end of the lower corner member 26. The cylindrical body 56 of the insert 54 has a hollow interior 76 opening thereinto from the collet-defining bottom end of the insert. The diameter of this hollow interior 76 equals or slightly exceeds an outer diameter of the table legs 12, which are cylindrical in shape and may for example be made of metal tubing. With reference to FIG. 4, a top end 12a of a respective table leg 12 is inserted into the hollow interior 76 of the insert 54 of each corner assembly.

Figure 5A:
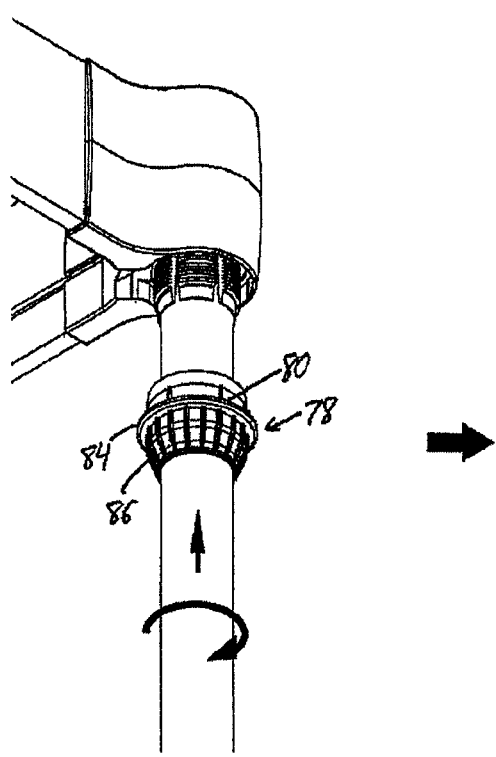
FIG. 5A is a perspective view illustrating coupling of a threaded collar to a threaded lower end of the generally cylindrical insert of FIG. 4B in order to clamp together the upper and lower corner members and the associated upright table leg.
Figure 5B:
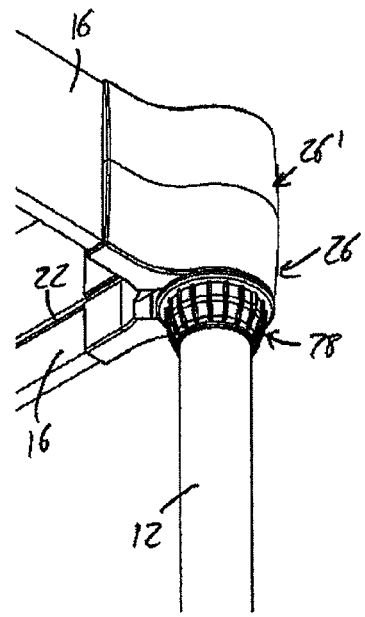
FIG. 5B is a perspective view showing the threaded collar of FIG. 5A in its installed position mated with the generally cylindrical insert in abutment against the lower corner member.

Turning to FIG. 5, an internally threaded collar 78 disposed around the table leg 12 is slid axially upward along the table leg 12 toward the externally threaded collet body at the bottom end of the insert 54. Internal threading on the collar 78 is configured for mating cooperation with the external threading 64 of the insert 54, whereby threaded advancement of the collar 78 on the insert 54 drives the collar 78 upward into abutment with the underside of the lower corner member 26. During this threading of the collar onto the insert 54, rotation of the insert is prevent by the stop tab 72, and downward displacement of the insert 54 is prevented by the support flanges 48 of the upper corner member. Accordingly, the upward advancement of the of the threaded collar on the insert forces the lower corner member 26 upwardly toward the upper corner member 26' to force the upper and lower corner members tighter together, thereby clamping the adjacent frame members 16 firmly between the channels 30, 30' of the upper and lower corner members. The threading of the collar 78 onto the collet body also forces the arcuate sections 60 of the split collet body radially inward against the outer circumference of the table leg 12, thereby firmly clamping the table leg in place. The insert 54 and cooperating collar 78 thereby form a tightening mechanism that serves to not only clamp the corner members 26, 26' together, but also to clamp the table leg 12 thereto.

FIG. 10 shows more detail of the threaded collar 78. An upper cylindrical portion 80 of the collar 78 features internal threading 82 that spans upward from a lower end of the cylindrical portion 80. As shown, this internal threading may terminate before reaching the top end of the collar. At an intermediate point along the axial length of the cylindrical portion 80, an exterior flange 84 projects radially outward from the cylindrical portion 80 of the collar around the full circumference thereof. The cylindrical portion 80 has an outer diameter that is less than a diameter of the lower corner member's hollow axial passage 44 at the bottom end of the lower corner member 26 so that threading of the collar 78 onto the exposed collet body of the insert 54 below the lower corner member 26 drives upper end of the collar's cylindrical portion 80 up into the hollow axial passage 44 of the lower corner member 26 in the annular space around the insert 54. Under sufficient threading of the collar onto the insert, the exterior flange 84 of the collar 78 eventually abuts up against the underside of the lower corner member 26 to tighten the lower corner member 26 up against the bottom edge of the adjacent frame members 16 to thereby securely clamp the upper and lower corner members together with the frame members clamped securely between them.

Below its cylindrical portion 80, the collar 78 features a tapered portion 86 that narrows toward the bottom end of the collar. The inner diameter of the collar, even where it is narrowest at the bottom end of the tapered portion 86, slightly exceeds the outer diameter of the table leg 12 so as to be axially slidable thereon. However, the inner diameter at the bottom end of the tapered portion 86 of the collar is less than the default outer diameter of the split collet body of the insert 54, whereby the threaded advancement of the collar 78 on the insert 54 drives the tapered lower portion 86 of the collar up over the tapered bottom end 66 of the insert, where the constricting inner diameter of the collar's tapered portion 86 forces the arcuate sections 60 of the collet body radially inward against the outer circumference of the table leg 12 in order to securely lock the leg in its fully inserted position in the corner assembly. As shown, the collar 78 may feature texture-providing grips, such as raised exterior ribs 88 lying axially of the collar at equally spaced intervals therearound at the area below the exterior flange 84, in order to aid with tool-free manual rotation of the collar during engagement and disengagement thereof with the insert 54 during assembly and disassembly of the corner unit.

Figure 6A:
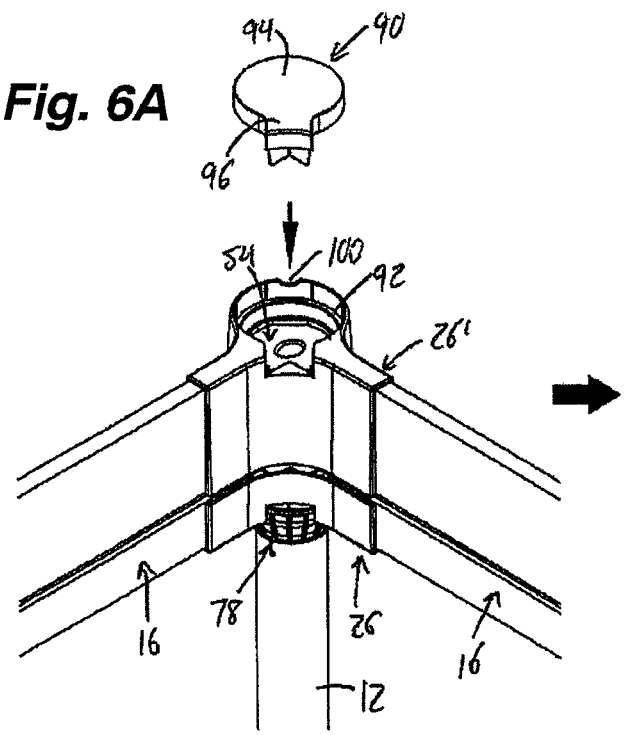
FIG. 6A is a perspective view illustrating installation of a finishing cap on the hub of the upper corner member of FIG. 5B in order to conceal the generally cylindrical insert received therein.
Figure 6B:
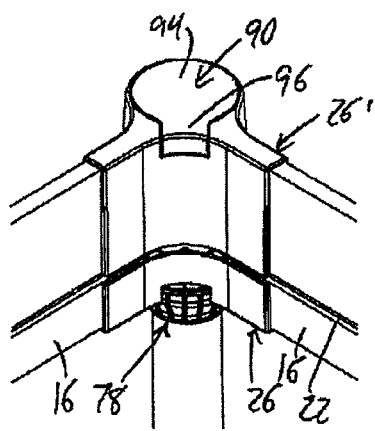
FIG. 6B is a perspective view showing the finishing cap of FIG. 6A in its installed position, thereby reflecting a fully-assembled finished state of the corner assembly.

Turning to FIG. 6, a finishing cap 90 is installed in the hollow axial passage 44' at the open top end of the upper corner member 26' to close off this passage and thereby conceal the head 68 of the insert 54 beneath the cap 90. A wall thickness of the outer wall 40' of the upper corner member's hub 28' decreases in a step-wise fashion at short distance downward from the open top end of the hub 28', and the support flanges 48 for seating of the insert 54 are found at this lower diameter area. The step-wise decrease in diameter creates an annular interior ledge 92 a short distance above the elevation at which the support flanges 48' are located. The cap 90 features a circular portion 94 whose outer diameter fits within the top end of the axial passage 44', but exceeds the diameter of the axial passage 44' at the reduced-diameter area thereof so that the cap 90 is seated atop the interior ledge 92 in the cap's installed position.

Like the head 68 of the insert 54, the illustrated cap 90 features a radial tab 96 jutting outward from the otherwise circular remainder of the cap. The central span 42' of the upper corner member that joins together the inner side walls 34' of the open-bottom bottom channels 30' features a rectangular cut-out 98 that reaches downward from the top end of the upper corner member 26' down to the internally flanged and circumferentially gapped area thereof, and reaches inwardly into the hollow axial passage 44'. This cut-out 98 accepts insertion of the radial tab 96 of the cap. The cap and hub are configured to provide a snap fit between them, and a small notch 100 is provided in the top end of the hub wall 40' of the upper corner member at a position diametrically opposite the cut-out 96 for prying of the cap from its installed position during disassembly of the corner unit.

Having described assembly of one corner unit from the upper corner member, lower corner member, the insert, the threaded collar, and the optional finishing cap, a complete games table is assembled by first assembling two corner units with three frame members to form a perimeter wall on three sides of a game play area, at which point the game play surface panel 20 can be slid into the longitudinal slots 22 of the three frame members, as enabled by the presence of a gap left between the inner side walls 34, 34' of the upper and lower corner members. This gap is left open due to the fact that the height of the lower member's inner side wall is no greater than the distance from the lower edges 16a of the frame members 16 to the longitudinal slots 22 thereof, and the height of the upper member's inner side wall 34' is no greater than the distance from the upper edges 16b of the frame members 16 to the longitudinal slots 22 thereof. With the panel 20 engaged into the slots 22 of the three assembled frame members, the fourth and final fame member can then be installed by assembling the two remaining corner units at the opposing ends of the final frame member.

The forgoing description discloses a corner assembly formed by five components, namely the upper corner member, lower corner member, the insert, the threaded collar, and the finishing cap. The clamping together of the upper and lower corner members via the insert and threaded collar vertically clamps the frame members in place between the corner members to prevent vertical separation of the frame members from the corner units, while the mating of the protrusions in the channels of the corner members with the blind holes in the frame members prevents horizontal separation, all without with use of screws or other separate fasteners to directly fasten the corner units to the frame members. Instead, the clamping together of the corner members with the manually-operated collar secures the corner units and frame members together without use of any tools or separate fasteners.

The above described assembly technique includes installation of the table legs 12 during assembly of the corner units so that a table top unit assembled from the frame members 16, corner units 14 and game play surface panel 20 is elevated up off the ground by the leg 12 for standing play of a game on the game play surface. Alternatively, a legless games table unit for tabletop use can be assembled by following the same general process, but without installation of the table legs 12, whereby the threaded collars 78 installed at the underside of the lower corner members 26 can be seated atop a desk, table or other suitable support surface.

FIGS. 14 and 17 illustrate yet another option in which two table top units are assembled, one with a corresponding set of legs, and one without. By removing the finishing caps 90 from the upper corner members of the leg-equipped games table 10, this opens up the top end of the hollow axial passage 44'. The threaded collar 78 installed at the underside of each lower corner members 26 of the legless table top unit 10' has an outer diameter at its bottom end that is slightly smaller than the open top end of the axial passage 44' of each upper corner member 26' of the leg-equipped games table 10, whereby the threaded collars 78 at the underside of the legless table top unit serve as male features matably receivable in the female features defined by the open top ends of the corner units of the leg-equipped games table. Accordingly, the legless table top unit can be stacked atop the leg-equipped games table 10 by lowering the collar-defined male features of the legless table top unit into the female openings in the upper corner members of the leg-equipped games table 10. When so mated, the cooperating male and female features block horizontal sliding of the legless table top unit off of, or out of alignment with, the underlying leg-equipped games table 10. As shown in FIGS. 14 and 17, the removed finishing caps 90 from the leg-equipped games table can be reinstalled on the upper corner members of the legless upper table top unit. Accordingly, the use of two table top units as separable, stackable parts of an overall system in which only one set of legs is employed allows a user to easily and quickly switch between different modes of game play by simply adding or removing the legless table top unit to or from the leg-equipped table top unit, without need for any tools. So, as one non-limiting example, a foosball table top unit could simply be stacked atop an air hockey unit as desired in order to change from an air hockey mode of game play to a foosball mode of game play.

With reference to FIG. 15, the finishing caps 90 of the corner units are not only removable, but also invertible. Briefly turning back to FIG. 11, each cap 90 features a vertical perimeter wall 102 spanning fully around a horizontally oriented planar body 104 having flat first and second sides 104a, 104b. The perimeter wall 102 extends perpendicularly from the flat first side 104a around the full perimeter thereof, thus surrounding the combined circular and tab-like areas of the planar body 104. A pair of perpendicularly diverging walls 106 also extend perpendicularly from the first side 104a of the planar body 104, but extend further therefrom than the perimeter wall 102. FIGS. 13 and 14 illustrate installation of the caps 90 in a second-side-up orientation in which the non-walled second side 104b of the planar cap body 104 faces upward and resides flush with the surrounding top end of the corner unit (i.e. flush with the top end of the upper corner member's hollow axial passage 44' at the topside of the hub 28', and likewise flush with the closed top walls 32' of the open-bottom channels) when the perimeter wall 102 of the cap is seated atop the interior ledge 92 of the upper corner member's hollow axial passage 44'.

In this second-side-up orientation, the diverging walls 106 projecting from the first side of the cap simply depend downwardly into the upper corner member 26' behind the portion of the perimeter wall 92 that fills in the rectangular cut-out 98 in the central wall span 42 of the upper corner member 26'. The diverging walls 106 continue further downward behind this central wall span 42, whereby the diverging walls 106 of each cap 90 are concealed within the respective upper corner member when the caps are installed in the second-side-up orientation.

FIG. 15 on the other hand illustrates installation of the caps 90 in a first-side-up orientation in which the non-walled second side 104b of the cap body 104 is seated atop the interior ledge 92 of the upper corner member 26', and the pair of diverging walls 106 stand upwardly from the perimeter-walled first side 104a of the cap body that faces upwardly out of the upper corner member's hollow axial passage 44'. Since the diverging walls 106 are taller than the perimeter wall 102, the diverging walls 106 reach upwardly past the open top end of the hub 28' of the upper corner member 26'. Here, the second-side-up caps 90 can cooperate with a secondary game play panel 20' to support this panel 20' in a position overlying the primary game play panel 20 that is carried by the longitudinal slots 22 of the elongated frame members 16. The secondary game play panel 20' thereby enables a second mode of game play without any disassembly of the table legs 12, corner units and frame members 16. More specifically, the diverging walls 96 of each cap form a respective corner brace for embracing about a respective outer corner of the secondary game play panel 20' at intersecting perimeter edges thereof. The portion 102a of the perimeter wall 102 of the cap 90 that spans between the two diverging walls 106 of the corner brace at the interior corner defined between these diverging walls 106 forms a support seat atop which the respective corner of the secondary game play panel 20' is seated. Since this support seat portion 102a of the cap's perimeter wall resides at the radial tab 96 of the cap 90 that juts inwardly toward the game play area relative to the imaginary intersection point of the adjacent frame members 16 connected by the respective corner unit, the secondary game panel 20' may be slightly smaller in area than the game play area of the primary game play panel 20, and thus may be supported entirely atop the corner caps 90 without sitting on the elongated frame members 16, as shown in the close-up view on the right side of FIG. 15b.

As described above, FIGS. 14 and 17 illustrate stacking of a legless table top unit atop a leg-equipped games table to serve as a second game unit for enabling a second mode of game play without disassembly of the leg-equipped table. FIG. 16 illustrates use of a different type of second game unit 108 with a leg-equipped games table, and once again employs uncapped corner units to support the second game unit. In the illustrated example, the second game unit is a basketball game unit 108 featuring a basketball backboard 110 with a basketball net 112 attached to a front face of the backboard. The backboard 110 is supported by a pair of support arms 114 that extend downwardly from the lower end of the backboard 110 at opposing side edges thereof. A lower end 114a of each support arm 114 defines a male insertion feature for cooperating with female features of a respective corner unit at one end of the games table.

The lower end 114a of each support arm 114 is lowered down into the hollow axial passage 44' of the upper corner member 26' of the respective corner unit, where the lower end 114a of the support arm 114 is inserted further down into a mating female socket 116 provided in the threaded insert 54 of the corner unit. The female socket 116 of the insert 54 is more clearly visible in the isolated view of the insert 54 in FIG. 9, where the socket 116 can be seen to open into the head-equipped top end of the insert. The socket 116 terminates in a closed end wall 116a at an intermediate location along the axial length of the insert 54. The lower end 114a of the support arm is seated atop the closed end wall 116a of the female socket 116 of the insert 54 in order to support the basketball game unit 108 in a working position standing upright from the table top unit of the leg-equipped games table.

The support arms 114 thus carry the backboard 110 in a vertical plane at an elevated position spaced above the primary game play panel 20 that is horizontally carried by the elongated frame members 16 of the table top unit. In both the instance of the stacked table top units of FIGS. 14 and 17, and the instance of the table top unit and upright basketball unit of FIG. 16, a secondary unit defining a second game related area on a second game play panel is supported in elevated relation to the first game play area of the primary game play panel 20, and the second game unit is supported by the corner units of the frame that carries the primary game play panel 20. In the example of FIG. 16, the second game play panel is the basketball backboard 110, whose front side defines the second game play area. A user can dribble a basketball on the first game play panel 20, and shoot the ball of the backboard 110 into the attached basketball net 112. Other examples of secondary game play panels useful in an upright orientation over the primary game play panel would be a scoreboard display panel, or a ping-pong return panel that stands upright at the end of the primary game play panel 20 for cooperation therewith in a single-player ping-pong game.

The illustrated support arms 114 of the basketball game unit 108 are of longitudinally deviated shape, first extending upward from the two corner units at the respective end of the games table, then curving outwardly beyond this end of the table before turning vertically upright again in order to carry the basketball backboard in a vertical plane situated past the end of the games table, with the attached basketball net reaching back toward the primary game play area. However, with a scoreboard, return-board or other type of secondary game play panel, such offsetting of the secondary game play panel outwardly from over the primary game play panel 20 may not be necessary, and so support arms of other shapes (e.g. purely linear, vertically upright arms) may be employed.

The illustrated embodiment of the upper and lower corner members of each corner unit differ from one another only in the relative heights of the channel side walls, and thus share the same hub structure with same hollow axial passage and associated support flanges and interior ledge. Accordingly, just as the insert 54 can be seated within the hollow axial passage 44' of the upper corner member 26', the insert can likewise be seated within the hollow axial passage 44 of the lower corner member 26. This allows use of the table top unit in either one of two inverted orientations. Accordingly, the primary game play panel 20 can be a double-sided panel presenting different indicia or surface characteristics on opposing first and second sides 20a, 20b of the panel 20, whereby a first type of game can be played on the first side 20a of the panel than on the second side 20b thereof to enable different modes of game play simply by inverting the table-top unit on the table legs.

FIG. 18b shows a table top unit of the type described above that has initially been installed in a first-side-up orientation on the table legs for a first mode of game play. To invert the table top unit, one first unthreads the threaded collars from the inserts of the four corner units and then withdraws the table legs from the corner units, as shown in FIG. 18c. Turning to FIG. 18e, one then removes the four finishing caps 90 from the corner units, and withdraws the respective inserts 54 therefrom. The primary game play panel 20 and the frame formed by the elongated frame members and corner units surrounding the panel 20 are then inverted into a second-side-up orientation, as illustrated in FIG. 18g. With the second side of the primary game play panel 20 now facing upward for use in a second mode of game play, the inserts 54 are reinserted downwardly into the through-bores of the corner units. The inserts are therefore now seated in what was formerly referred to as the 'lower' corner members of the corner units, which now actually define the top halves of the corner units due to the newly inverted position of the primary game panel 20 and associated frame. The table legs are inserted upwardly into collet bodies of the inserts 54, and the threaded collars are engaged to the collets to firmly secure the corner members and table legs together. The finishing caps are reinstalled over the inserts in the hollow axial passages of the formerly lower (and now upper) corner members 26, thereby completing the assembly of the games table with the primary game play panel 20 in the inverted or second-side-up orientation. In either orientation, the table top unit assembled from the primary game panel, elongated frame members and cooperating corner units can be used with the finishing caps 90 removed to enable support of a second table top unit stacked thereatop (as shown in FIGS. 14 and 17) or support of a different type of second game unit (as shown in FIG. 16), or used with the finishing caps 90 installed in the first-side-up orientation of FIG. 15 in order to support a secondary game play panel 20' between the corner braces 106 of the caps 90.

It will be appreciated that stacked or other cooperating support of multiple game units atop the same set of table legs using cooperating male and female features at corners of the table-top units, support of a secondary game panel between braces at the corner units of the table top unit, and/or an invertibility of the table top unit for different modes of game play may be employed regardless of whether the corner units specifically employ the clamp-together multi-piece assembly of the type described in detail above. Similarly, embodiments of the clamp-together multi-piece corner unit assembly other than those specifically detailed above are also contemplated within the scope of the present invention. For example, while the illustrated embodiment employs threaded collars slidably and removably disposed on the table leg make the threaded connection to the insert, another embodiment may instead feature a direct threaded connection of the table leg to the insert. However, as described above, the use of a threaded collar 78 may present certain advantages, for example to enable the stackable functionality described above. As another example, the benefit of tool-free assembly may be recognized using the same clamped-together concept to tighten upper and lower corner members together across a frame member sandwiched between them regardless of whether the tightening mechanism specifically employs a threaded insert and cooperating threaded collar or table leg. Also, while the frame members in the illustrated embodiment are used to form boundary walls for the game play area that stand upward from the game play surface, similar assembly of corner units and frame members could be used to define an underframe for an overlying game play surface that is supported atop, and may overhang, the frame members.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A games table apparatus comprising:
   a set of table legs;
   a table top unit comprising a set of elongated frame members that are situated end-to-end around a first game play area, and a plurality of corner units that each interconnect a respective adjacent pair of the elongated frame members at a corner of the first game play area, an upper end of each corner unit having a female opening therein at an upper end thereof and the corner units being connectable to the table legs for elevated support of the first game play area by said table legs;
   a second game unit defining a second game related area and comprising at least one male insertion feature that is insertable downwardly into the female opening in the upper end of a respective one of the corner units to mate the male insertion feature with said respective one of the corner units in a manner supporting the second game related area in an elevated relation the first game play area;
   wherein the frame of the table top unit carries a first game play panel atop which the first game play area is defined, and the second game unit comprises at least one support arm defining the at least one male insertion feature at a lower end of said support arm, the at least one support arm carrying a second game play panel in an upright plane lying transverse to a more horizontal plane of the first game play panel.

2. The apparatus of claim 1 wherein the second gam, play panel is a backboard, scoreboard or return board.

3. The apparatus of claim 1 wherein the female opening of each corner unit is an open top end of a through-bore of said corner unit, and each corner unit comprises an insert seated in the through-bore and a threaded collar that is coupled to a threaded lower end of said insert at the lower end of the corner unit.

4. The apparatus of claim 3 wherein the insert of each corner unit comprises a recessed socket in an upper end thereof, the recessed socket having a cross-section that is smaller than the female opening at the open top end of the through-bore and is cooperatively shaped for mating receipt of the male insertion feature within said recessed socket.

5. A games table apparatus comprising:
   a set of table legs;
   a table top unit comprising a set of elongated frame members that are situated end-to-end around a first game play area, and a plurality of corner units that each interconnect a respective adjacent pair of the elongated frame members at a corner of the first game play area, an upper end of each corner unit having a female opening therein at an upper end thereof and the corner units being connectable to the table legs for elevated support of the first game play area by said table legs;
   a second game unit defining a second game related area and comprising at least one male insertion feature that is insertable downwardly into the female opening in the upper end of a respective one of the corner units to mate the male insertion with said respective one of the corner units in a manner supporting the second game related area in an elevated relation the first game play area;
   wherein the female opening of each corner unit is an open top end of a through-bore of said corner unit whose lower end is sized for mating receipt of one of the table legs, and each corner unit comprises an insert seated in the through-bore and a threaded collar that is coupled to a threaded lower end of said insert at the lower end of the corner unit.

6. The games table of claim 5 wherein the insert of each corner unit has a hollow interior passage opening into a bottom end of said insert and sized for receipt of the top end of said one of the table legs therein, and the threaded collar of each corner unit is sized for sliding receipt thereof over one of the table legs.

7. The games table system of claim 6 wherein the bottom end of the insert of each corner unit is a split collet body into which the hollow interior passage extends, the split collet body having external threads matable with internal threads of the threaded collar, whereby receipt of the top end of said one of table legs in the insert and advancement of the threaded collar on the external threads of the split collet body tightens said split collet body around said one of the table legs to secure said one of the table legs to the corner unit.

8. The games table system of claim 5 wherein each corner unit comprises:
   an upper corner member having a first hub through which the through-bore extends in an upright direction, and a pair of open-bottom channels diverging outwardly from the first hub and embracing over upper edges of the adjacent pair of said elongated frame members at respective ends thereof; and
   a lower corner member having a second hub through which the through-bore extends in the upright direction, and a pair of open-top channels diverging outwardly from the second hub and embracing around lower edges of the adjacent pair of said elongated frame members at the respective ends thereof;
   wherein the insert is seated within the hub of the upper corner member and hangs therefrom hang into the second hub of the lower corner member, and the threaded collar is sized to abut against an underside of the lower corner member under advancement of the threaded collar on the first set of threads so as to force the lower corner member toward the upper corner member and thereby clamp the adjacent pair of said elongated frame members in place between said upper and lower corner members.

9. The apparatus of claim 8 wherein the through-bore comprises a respective support flange jutting inward from a boundary wall of said through-bore at each of the corner members, and the insert comprises an enlarged head dimensioned to abut against the respective support flange under insertion of the insert into the through-bore to define the position cooperatively seated with the respective one of the corner members via which the insert was inserted.

10. A games table apparatus comprising:
    a frame comprising a set of elongated frame members situated end-to-end around a game play area and a plurality of corner units each interconnecting a respective adjacent pair of the elongated frame members at a corner of the game play area;
    a respective corner brace standing or standable upwardly from each corner unit;
    a primary game play surface supported within said game play area for use in a first mode of gameplay; and
    a secondary game play panel arranged for selective placement over the primary game play area in a useful position braced between the corner braces of the corner units to define a secondary game play surface for use in a second mode of gameplay.

11. The games table apparatus of claim 10 wherein each corner brace is defined by a respective removable and invertible cap of the corner unit, the cap being selectively mountable to the corner unit in a first position in which the respective corner brace stands upward for cooperative use with the secondary game play panel and a second position in which the respective corner brace depends downwardly into the corner unit to conceal said corner brace.

12. The games table apparatus of claim 11 wherein each corner unit and the respective removable and invertible cap are arranged to reside flush with one another at an upper end of the corner unit when the cap is mounted to the corner unit in the second position.

13. The apparatus of claim 10 wherein each corner brace comprises a pair of diverging walls for respectively abutting against adjacent perimeter edges of the secondary game play panel and a support seat resides at a base of said diverging walls at an inside corner between said diverging walls to carry the second game play panel atop said support seat.

14. A games table apparatus comprising:
a frame comprising a set of elongated frame members situated end-to-end around a game play area and a plurality of corner units each interconnecting a respective adjacent pair of the elongated frame members at a corner of the game play area;
a double-sided game play panel supported in the game play area by the frame; and
a set of table legs;
wherein each corner unit comprises hollow axial passages extending thereinto from both top and bottom ends thereof, each hollow axial passage being sized to accommodate receipt of an upper end of one of the table legs therein, whereby the frame is invertible between a first-side-up orientation mounted atop the table legs with a first side of the double-sided game play panel facing upward for a first mode of game play on said first side of the double-sided game play panel, and a second-side-up orientation mounted atop the table legs with a second side of the double-sided game play panel facing upward for a second mode of game play one said second side of the double-sided game play panel.

15. The apparatus of claim 14 wherein the hollow axial passages of each corner unit are respectively defined in a pair of corner members of said corner unit, and said hollow axial passages align with one another and define a collective through-bore passing fully through the assembled corner members of the corner unit, and each corner unit further comprises a threaded insert that is insertable into the collective through-bore via an open end of either of the hollow axial passages into a position cooperatively seated with the respective one of the corner members via which the insert was inserted, from which the insert reaches into the hollow axial passage of the other corner member and mates with a threaded feature at a respective one of the table legs.

* * * * *